(12) United States Patent
Hoof

(10) Patent No.: US 9,881,409 B2
(45) Date of Patent: *Jan. 30, 2018

(54) VISUALIZATION FOR BLOOD FLOW IN SKIN IMAGE DATA

(71) Applicant: Microsoft Technology Licensing, LLC, Redmond, WA (US)

(72) Inventor: Jonathan R. Hoof, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/413,904

(22) Filed: Jan. 24, 2017

(65) Prior Publication Data

US 2017/0169597 A1 Jun. 15, 2017

Related U.S. Application Data

(63) Continuation of application No. 14/518,755, filed on Oct. 20, 2014, now Pat. No. 9,582,865.

(51) Int. Cl.
*G06K 9/00* (2006.01)
*G06T 11/60* (2006.01)
*G06T 7/00* (2017.01)

(52) U.S. Cl.
CPC ............ *G06T 11/60* (2013.01); *G06T 7/0012* (2013.01); *G06T 2207/10024* (2013.01);
(Continued)

(58) Field of Classification Search
CPC ........... G06T 5/009; G06T 5/50; G06T 7/408; G06T 2207/10024; G06T 2207/20221; G06T 2207/20224; G06T 2207/30104; G06T 7/90; G06T 7/0012; G06T 7/0016; G06T 7/0028; G06T 11/001; G06T 11/60; G06T 2207/30201; G06K 9/00255; G06K 9/00261; G06K 9/629; A61B 5/0064; A61B 5/015; A61B 5/0082; A61B 5/02405; A61B 5/6898

See application file for complete search history.

(56) References Cited

U.S. PATENT DOCUMENTS

2003/0016726 A1* 1/2003 Pavlidis ................. A61B 5/015
 374/45
2010/0172567 A1* 7/2010 Prokoski .............. A61B 5/0064
 382/132

(Continued)

OTHER PUBLICATIONS

"Corrected Notice of Allowance Issued in U.S. Appl. No. 14/518,755", dated Nov. 10, 2016, 2 Pages.

(Continued)

*Primary Examiner* — Yon Couso
(74) *Attorney, Agent, or Firm* — Baker & Hostetler LLP

(57) ABSTRACT

Blood flow beneath a user's skin, for example, in a user's face may be visually rendered. In some aspects, a plurality of differences is determined in the intensity of pixels of a first image and the corresponding pixels of a subsequent second image. In some aspects, this plurality of differences is enhanced to accentuate a characteristic associated with the first image and the second image. The enhanced plurality of differences is visually rendered for each subsequent comparison of pixel intensity values.

20 Claims, 8 Drawing Sheets

(52) U.S. Cl.
CPC ............... *G06T 2207/20221* (2013.01); *G06T 2207/30104* (2013.01); *G06T 2207/30201* (2013.01)

(56) References Cited

U.S. PATENT DOCUMENTS

| | | | | |
|---|---|---|---|---|
| 2014/0276114 | A1* | 9/2014 | Maeda | A61B 5/0082 600/479 |
| 2015/0302158 | A1* | 10/2015 | Morris | A61B 5/02405 702/19 |
| 2015/0366456 | A1* | 12/2015 | Takamori | A61B 5/6898 600/480 |
| 2015/0378433 | A1* | 12/2015 | Savastinuk | G06K 9/00255 345/156 |

OTHER PUBLICATIONS

"Non Final Office Action Issued in U.S. Appl. No. 14/518,755", dated Jun. 23, 2016, 10 Pages.

"Notice of Allowance Issued in U.S. Appl. No. 14/518,755", dated Oct. 20, 2016, 7 Pages.

Carvalho, et al., "Analysis of Heart Rate Monitoring Using a Webcam", In International Journal of Advanced Research in Computer and Communication Engineeing, vol. 3, Issue 5, May 2014, pp. 6593-6595.

Chen, et al., "Visualizing the Path of Blood Flow in Static Vessel Images for Image Guided Surgery of Cerebral Arteriovenous Malformations", In Proceedings of SPIE, Medical Imaging 2012: Image-Guided Procedures, Robotic Interventions, and Modeling, vol. 8316, Feb. 17, 2012, 10 Pages.

Huang, et al., "Noninvasive Blood Flow Imaging for Real-Time Feedback During Laser Therapy of Port Wine Stain Birthmarks", In Proceedings of Lasers in Surgery and Medicine, vol. 40, Issue 3, Mar. 2008, 16 Pages.

Imura, et al., "Blood Flow Visualization in Immersive Environment Based on Color Doppler Images", In IEEE 23rd Annual International Conference of the Engineering in Medicine and Biology Society, Oct. 25, 2001, pp. 3167-3170.

Poelma, et al., "Accurate Blood Flow Measurements: Are Artificial Tracers Necessary?", In Proceedings of PloS One, vol. 7, Issue 9, Sep. 20, 2012, 11 Pages.

Rubinstein, Michael, "Analysis and Visualization of Temporal Variations in Video", In Thesis Submitted to the Department of Electrical Engineering and Computer Science in Partial Fulfillment of the Requirements for the Degree of Doctor of Philosophy in Electrical Engineering and Computer Science at the Massachusetts Institute of Technology, Feb. 2014, 118 Pages.

Song, et al., "Effect of Signal Intensity and Camera Quantization on Laser Speckle Contrast Analysis", In Proceedings of Biomedical Optics Express, vol. 4, Issue 1, Jan. 1, 2013, 16 Pages.

Wu, et al., "Eulerian Video Magnification for Revealing Subtle Changes in the World", In Journal of ACM Transactions on Graphics, vol. 31, Issue 4, Aug. 5, 2012, pp. 1-8.

\* cited by examiner

VISUALIZATION FOR BLOOD FLOW IN SKIN IMAGE DATA

CROSS REFERENCE TO RELATED APPLICATIONS

This application is a continuation of U.S. patent application Ser. No. 14/518,755, filed on Oct. 20, 2014, which is incorporated herein by reference in its entirety.

BACKGROUND

Imaging techniques currently used by healthcare professionals include magnetic resonance imaging (MRI), ultrasound scanning, and computerized tomography (CT) scanning. It has been observed that the information gathered by these technologies can be useful in assessing a patient's overall health and risk for specific conditions or diseases. While useful, these technologies are expensive, require specialized training and expertise to operate, and are limited to certain hospital or clinical settings. Thus, the information these techniques provide is costly and hard to access.

It has been observed that some individuals wish to assess their own health and fitness outside of a professional healthcare environment. Personal trainers and coaches monitor athletes' physical status before, during, and after exercising to evaluate performance and maintain safety. Additionally, some consumer devices allow users to gauge their athletic performance. Pedometers, for example, can track how much an individual walks.

Cameras have been utilized to identify and track individuals. However, these techniques have been unable to adequately address determining the motion of blood flow through a person's blood vessels and presenting a visualization of the blood flow.

This Background is provided to introduce a brief context for the Summary and Detailed Description that follow. This Background is not intended to aid in determining the scope of the claimed subject matter nor be viewed as limiting the claimed subject matter to implementations that solve any or all of the disadvantages or problems presented above.

SUMMARY

Disclosed herein are systems and methods for skin blood flow visualization.

In one aspect, a method includes determining a plurality of differences in intensity, the plurality of differences made up of the difference in intensity between each pixel intensity of a plurality of pixel intensities of a first image and a corresponding plurality of pixel intensities of a subsequent second image. The differences in intensity comprise a delta image. A visual contrast of the delta image is enhanced to accentuate a characteristic associated with the delta image. The enhanced delta image is visually rendered for each subsequent comparison.

In another aspect, a system has a processor and a memory coupled to the processor, the memory having stored on it executable instructions that when executed by the processor cause the processor to effectuate operations. The operations include determining a plurality of differences in intensity comprising a difference in intensity between each pixel intensity of a plurality of pixel intensities of a first image and each pixel intensity of a corresponding plurality of pixel intensities of a subsequent second image. The differences in intensity comprise a delta image. A visual contrast of the delta image is enhanced to accentuate a characteristic associated with the image. The enhanced delta image is visually rendered for each subsequent comparison.

In another aspect, a computer readable storage medium comprises processor readable code for programming a processor to determine a plurality of differences in intensity. The plurality of differences in intensity comprises a difference in intensity between each pixel intensity of a plurality of pixel intensities of an image and each pixel intensity of a corresponding plurality of pixel intensities of a subsequent image. The differences in intensity comprise a delta image. A visual contrast of the delta image is enhanced to accentuate a characteristic associated with the image. The enhanced delta image is visually rendered for each subsequent comparison.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

It should be appreciated that the above-described subject matter may be implemented as a computer-controlled apparatus, a computer process, a computing system, or as an article of manufacture such as one or more computer-readable storage media. These and various other features will be apparent from a reading of the following Detailed Description and a review of the associated drawings.

BRIEF DESCRIPTION OF THE DRAWINGS

Like reference numerals indicate like elements in the drawings. Elements are not drawn to scale unless otherwise indicated.

DETAILED DESCRIPTION

Disclosed herein is skin blood flow visualization. Blood flow beneath a person's skin may be tracked by monitoring changes in the coloration of a person's skin. For example, changes in the "blush," or coloration of facial skin, may allow blood flow through a person's face to be determined. Images may be captured over time allowing the comparison of the color intensity of the skin at one point in time and the color intensity of the same skin subsequently. The changes in coloration reflect the flow of blood through blood vessels beneath the skin in that area. A visualization of this blood flow may be generated by capturing images of that area of skin at one point and capturing subsequent images of that area of skin.

Figure 1:
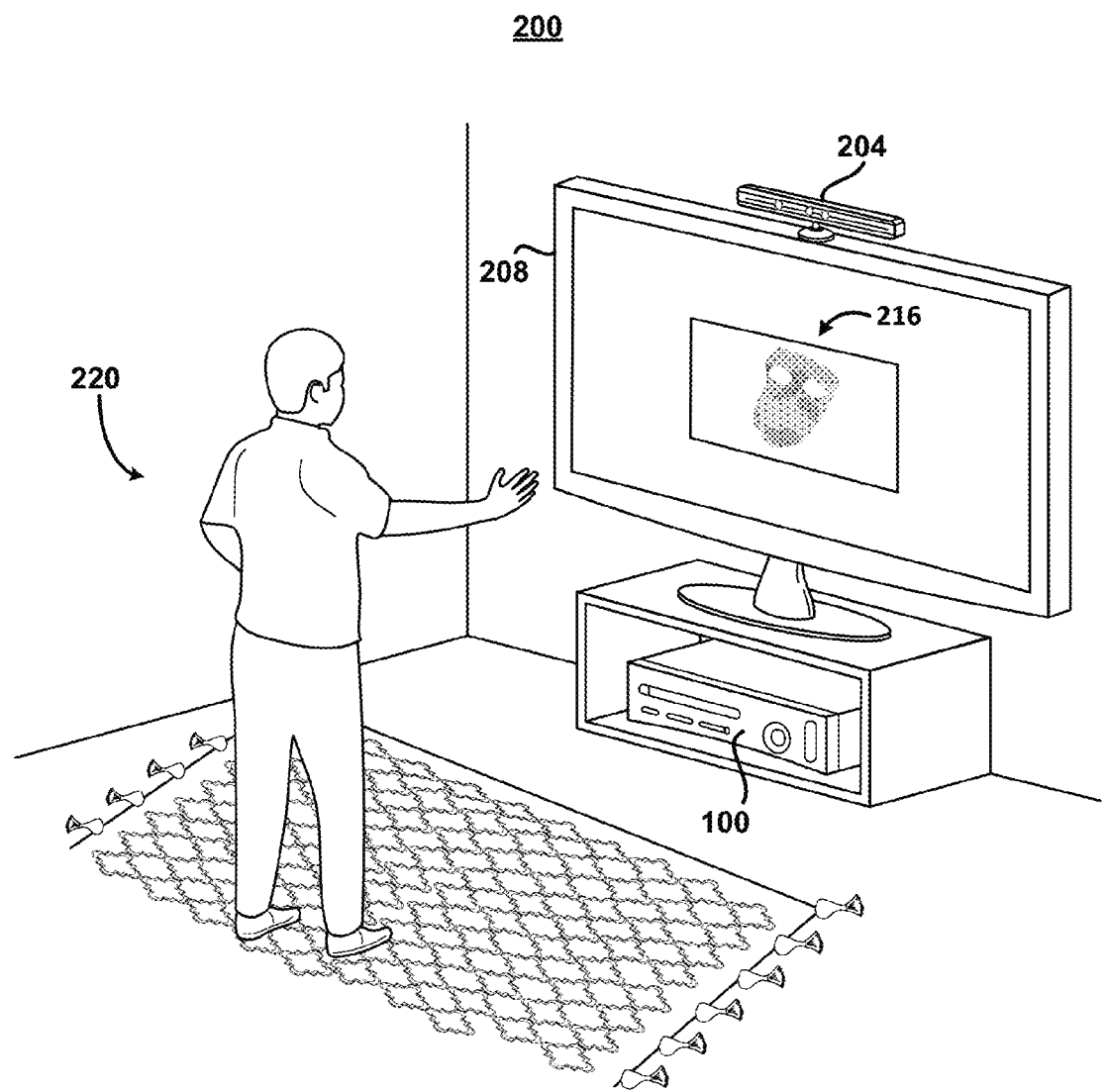
FIG. 1 shows an illustrative computing environment in which skin blood flow visualization may be implemented.

Turning to the drawings, FIG. 1 shows an illustrative computing environment 200 in which skin blood flow visualization may be implemented. It should be appreciated that environment 200 is provided as an example and that other environments which include other types of devices, applications, and usage scenarios may also be able to utilize the principles described herein. Environment 200 includes a computing platform such as multimedia console 100 that is typically configured for running gaming and non-gaming applications using local and/or networked programming and content, playing pre-recorded multimedia such as optical discs, including Digital Versatile Discs (DVDs), Blu-ray Discs (BDs), and Compact Discs (CDs), streaming multimedia from a network, participating in social media, browsing the Internet and other networked media and content, or the like, using a coupled audio/visual display 208, such as a television.

Multimedia console 100 in this example is operatively coupled to capture device 204 which may be implemented using one or more video cameras that are configured to visually monitor a physical space that is occupied by user 220. As described in more detail below, capture device 204 is configured to capture, track, and analyze the movements and/or gestures of user 220 so that they can be used as controls that may be employed to affect, for example, an application or an operating system running on multimedia console 100. Various motions of the hands or other body parts of user 220 may correspond to common system wide tasks such as selecting a game or other application from a main user interface.

For example, user 220 can navigate among selectable objects that include various icons that are shown on coupled display 208, browse through items in a hierarchical menu, open a file, close a file, save a file, or the like. In addition, user 220 may use movements and/or gestures to end, pause, or save a game, select a level, view high scores, communicate with a friend, etc. Virtually any controllable aspect of an operating system and/or application may be controlled by movements of user 220. A full range of motion of user 220 may be available, used, and analyzed in any suitable manner to interact with an application or operating system that executes in environment 200.

Capture device 204 can also be utilized to capture, track, and analyze movements by user 220 to control gameplay as a gaming application executes on the multimedia console 100. For example, as shown in FIG. 1, an application such as blood flow visualization application 216 which uses display 208 to provide a visual representation of the blood flow beneath an area of skin of the body of user 220, such as the face, to user 220. User 220 may make movements, such as jumping jacks and other calisthenics, to cause fluctuations in the blood flow visualization due to altered blood flow. User may concurrently monitor the blood flow visualization while performing other tasks, such as controlling other gaming applications. Movements of the user 220 may be recognized and analyzed such that corresponding movements for application control are performed.

Figure 2:
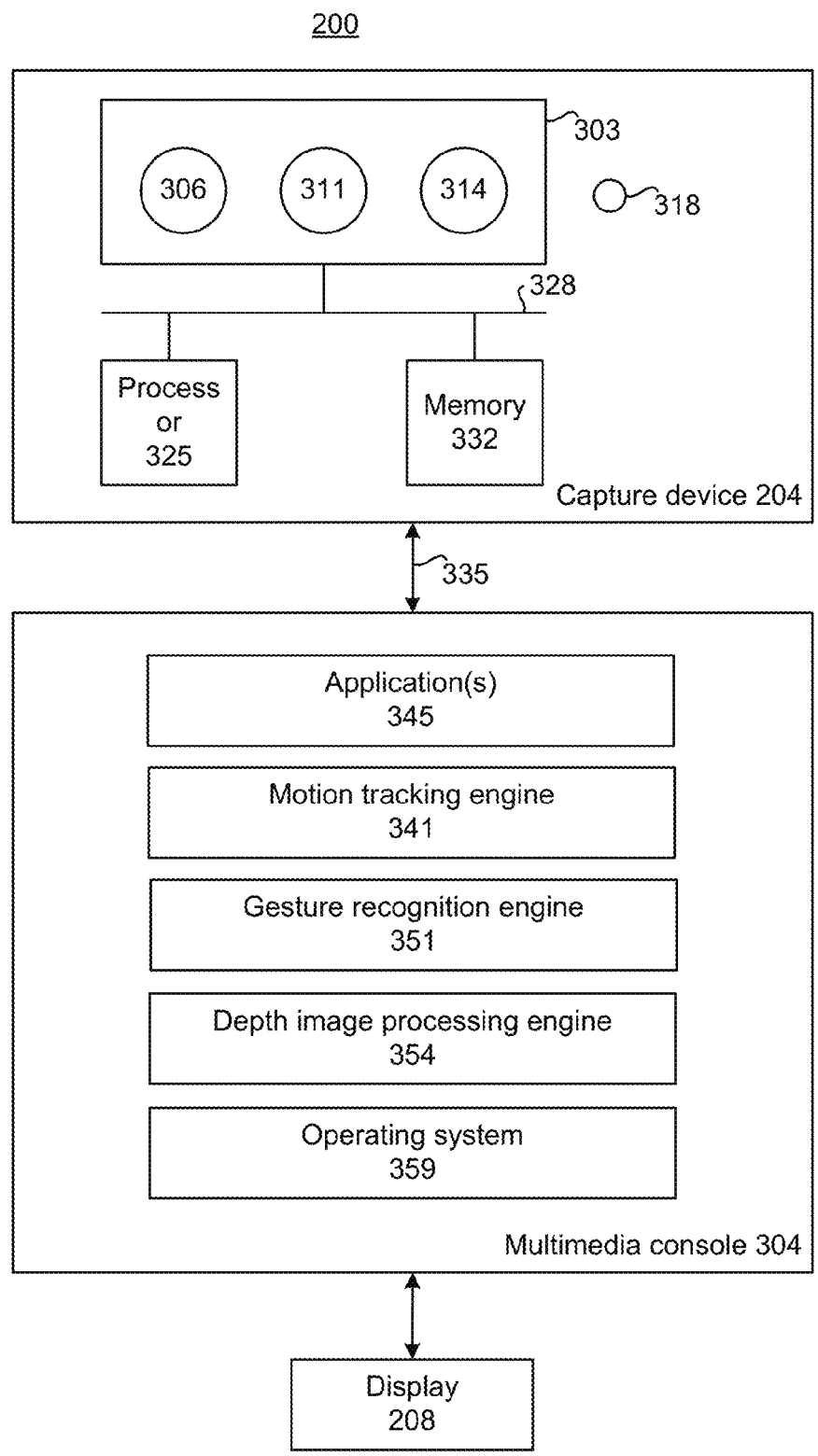
FIG. 2 shows an illustrative block diagram of a capture device that may be used in part to implement skin blood flow visualization.

FIG. 2 shows illustrative functional components of capture device 204 that may be used as part of a target recognition, analysis, and tracking system 200 to recognize human and non-human targets in a capture area of the physical space without the use of special sensing devices attached to the subjects, uniquely identify them, and track them in three-dimensional space. Capture device 204 may be configured to capture video with depth information including a depth image that may include depth values via any suitable technique including, for example, time-of-flight, structured light, stereo image, or the like. In some implementations, capture device 204 may organize the calculated depth information into "Z layers," or layers that may be perpendicular to a Z-axis extending from the depth camera along its line of sight.

As shown in FIG. 2, capture device 204 includes image camera component 303. Image camera component 303 may be configured to operate as a depth camera that may capture a depth image of a scene. The depth image may include a two-dimensional (2D) pixel area of the captured scene where each pixel in the 2D pixel area may represent a depth value such as a distance in, for example, centimeters, millimeters, or the like of an object in the captured scene from the camera. In this example, image camera component 303 includes IR light component 306, IR camera 311, and visible light RGB camera 314.

Various techniques may be utilized to capture depth video frames. For example, in time-of-flight analysis, IR light component 306 of capture device 204 may emit an infrared light onto the capture area and may then detect the back-scattered light from the surface of one or more targets and objects in the capture area using, for example, IR camera 311 and/or RGB camera 314. In some aspects, pulsed infrared light may be used such that the time between an outgoing light pulse and a corresponding incoming light pulse may be measured and used to determine a physical distance from the capture device 204 to a particular location on the targets or objects in the capture area. Additionally, the phase of the outgoing light wave may be compared to the phase of the incoming light wave to determine a phase shift. The phase shift may then be used to determine a physical distance from the capture device to a particular location on the targets or objects. Time-of-flight analysis may be used to indirectly determine a physical distance from capture device 204 to a particular location on the targets or objects by analyzing the intensity of the reflected beam of light over time via various techniques including, for example, shuttered light pulse imaging.

In other implementations, the capture device 204 may use structured light to capture depth information. In such an analysis, patterned light (i.e., light displayed as a known pattern such as a grid pattern or a stripe pattern) may be projected onto the capture area via, for example, IR light component 306. Upon striking the surface of one or more targets or objects in the capture area, the pattern may become deformed in response. Such a deformation of the pattern may be captured by, for example, by IR camera 311 and/or the RGB camera 314 and may then be analyzed to determine a physical distance from the capture device to a particular location on the targets or objects.

Capture device 204 may utilize two or more physically separated cameras that may view a capture area from different angles, to obtain visual stereo data that may be resolved to generate depth information. Other types of depth image arrangements using single or multiple cameras can also be used to create a depth image. Capture device 204 may further include microphone 318. Microphone 318 may include a transducer or sensor that may receive and convert sound into an electrical signal. Microphone 318 may be used to reduce feedback between the capture device 204 and multimedia console 100 in the target recognition, analysis, and tracking system 200. Additionally, microphone 318 may be used to receive audio signals that may also be provided by user 220 to control applications such as game applications, non-game applications, or the like that may be executed by multimedia console 100.

Capture device 204 may further include processor 325 that may be in operative communication with image camera component 303 over bus 328. Processor 325 may include a standardized processor, a specialized processor, a microprocessor, or the like that may execute instructions that may include instructions for storing profiles, receiving the depth image, determining whether a suitable target may be included in the depth image, converting the suitable target into a skeletal representation or model of the target, or any other suitable instruction. Capture device 204 may further include memory component 332 that may store the instructions that may be executed by processor 325, images or frames of images captured by the cameras, user profiles or any other suitable information, images, or the like. According to one example, memory component 332 may include random access memory (RAM), read only memory (ROM), cache, Flash memory, a hard disk, or any other suitable storage component. As shown in FIG. 2, memory component 332 may be a separate component in communication with image capture component 303 and processor 325. Alternatively, memory component 332 may be integrated into processor 325 and/or image capture component 303. In one aspect, some or all of components 303, 306, 311, 314, 318, 325, 328, and 332 of capture device 204 are located in a single housing.

Capture device 204 operatively communicates with the multimedia console 100 over a communication link 335. The communication link 335 may be a wired connection including, for example, a USB (Universal Serial Bus) connection, a Firewire connection, an Ethernet cable connection, or the like and/or a wireless connection such as a wireless 802.11 connection. Multimedia console 100 can provide a clock to the capture device 204 that may be used to determine when to capture, for example, a scene via communication link 335. Capture device 204 may provide the depth information and images captured by, for example, IR camera 311 and/or RGB camera 314, including a skeletal model and/or facial tracking model that may be generated by capture device 204, to multimedia console 100 via the communication link 335. Multimedia console 100 may then use the skeletal and/or facial tracking models, depth information, and captured images to, for example, create a virtual screen, adapt the user interface, and control an application.

Motion tracking engine 341 uses the skeletal and/or facial tracking models and the depth information to provide a control output to one more applications (representatively indicated by blood flow visualization application 216 in FIG. 2) running on the multimedia console 100 to which capture device 204 is coupled. The information may also be used by gesture recognition engine 351, depth image processing engine 354, or operating system 359. The depth image processing engine 354 uses the depth images to track motion of objects, such as the user and other objects. The depth image processing engine 354 will typically report to operating system 359 an identification of each object detected and the location of the object for each frame. Operating system 359 can use that information to update the position or movement of an avatar, for example, or other images shown on the display 108, or to perform an action on the user interface.

Gesture recognition engine 351 may utilize a gestures library (not shown) that can include a collection of gesture filters, each comprising information concerning a gesture that may be performed, for example, by a skeletal model (as the user moves). Gesture recognition engine 351 may compare the frames captured by capture device 204 in the form of the skeletal model and movements associated with it to the gesture filters in the gesture library to identify when a user (as represented by the skeletal model) has performed one or more gestures. Those gestures may be associated with various controls of an application. Thus, multimedia console 100 may employ the gestures library to interpret movements of the skeletal model and to control an operating system or an application running on the multimedia console based on the movements.

Figure 3:
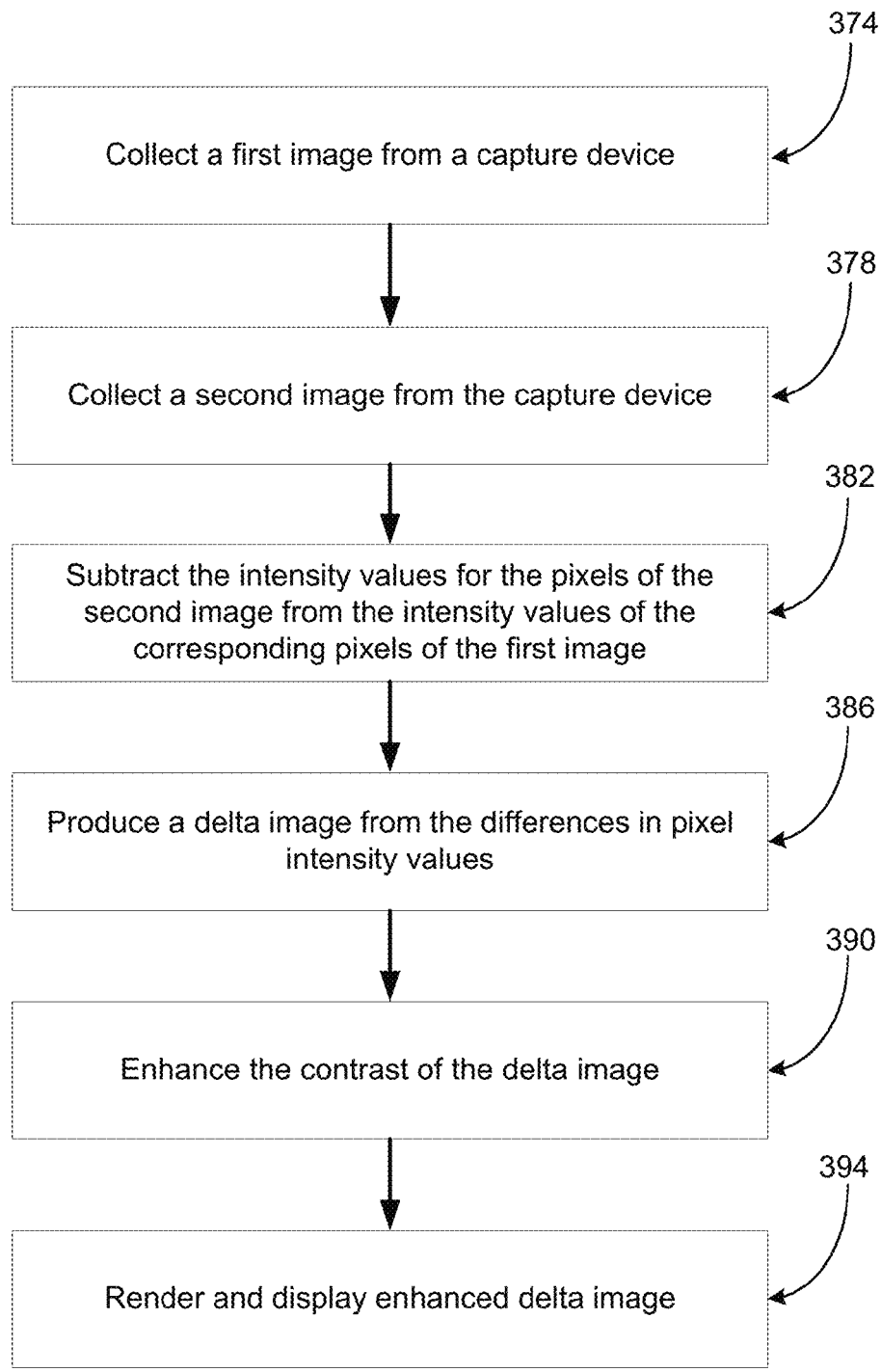
FIG. 3 shows a flowchart of an illustrative method of skin blood flow visualization.

FIG. 3 shows a flowchart of illustrative method of skin blood flow visualization 370. In 374, a first image is collected from a capture device, such as capture device 204. In 378, a second image is collected from the capture device. The first image and the second image, for example, may be subsequent images taken from a stream of video of an area of a user's skin, such the user's face. Each pixel of each image may be treated on its own. In 382, the intensity values for the pixels of the second image are subtracted from the intensity values of the corresponding pixels of the first image. The intensity value for a pixel may be, for example, the intensity of one more color channels, such as the infrared channel, in that pixel. In 386, the differences in values for each pixel are used to create a delta image. In 390, the contrast of the delta image is enhanced. In 394, the enhanced delta image is rendered and displayed.

Figure 4:
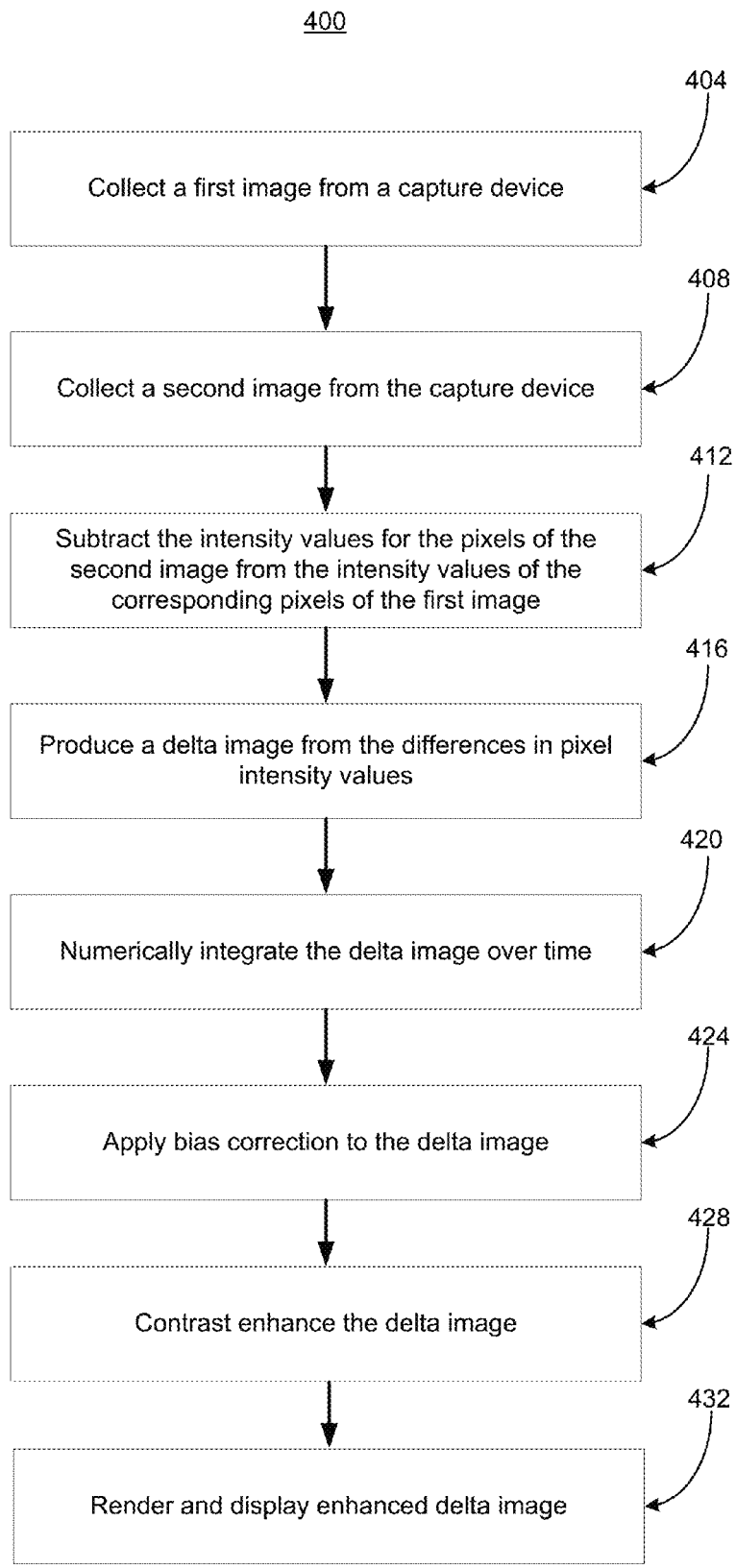
FIG. 4 shows a flowchart of an illustrative method of skin blood flow visualization.

FIG. 4 shows a flowchart of an illustrative method of skin blood flow visualization. In 404, a first image is collected from a capture device, such as capture device 204. In 408, a second image is collected from the capture device. The first image and the second image, for example, may be subsequent images taken from a stream of video of an area of a user's skin, such as the user's face. Each pixel of each image may be treated on its own. In 412, the intensity values for the pixels of the second image are subtracted from the intensity values of the corresponding pixels of the first image. The intensity value for a pixel may be, for example, the intensity of one more color channels, such as the infrared channel, in that pixel. In 416, the differences in values for each pixel are used to create a delta image. In 420, the delta image is numerically integrated per pixel over time. In 424, bias correction is applied to the delta image. Bias correction may comprise, for example, reducing the pixel intensity values of the delta image by a percentage of their values. In 428, the contrast of the delta image is enhanced. In 432, the enhanced delta image is rendered and displayed.

Figure 5A:
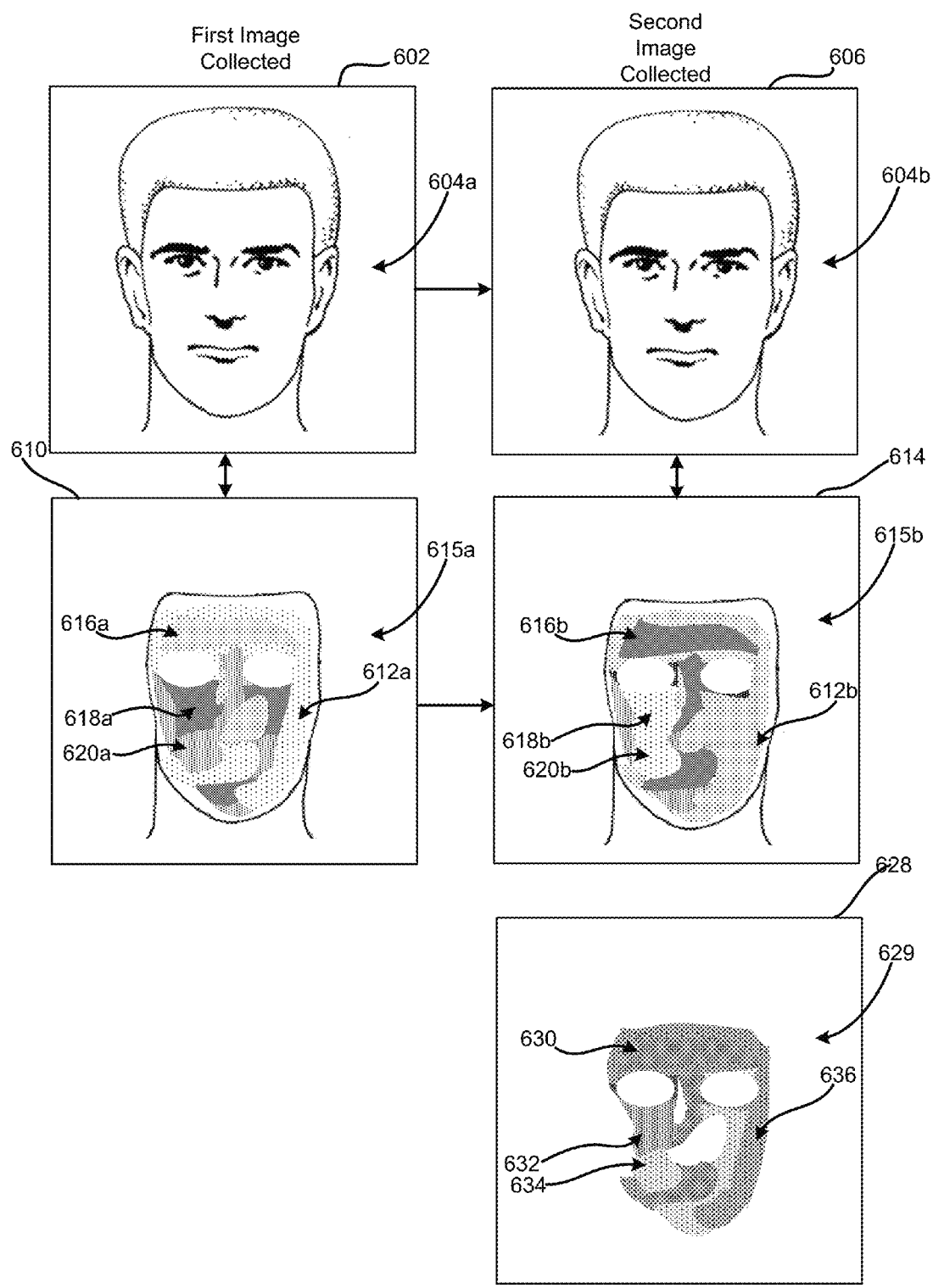
FIG. 5A shows an illustrative example of skin blood flow visualization of a human face.

FIG. 5A illustrates a visualization of blood flow in a human face. Human face 604a is captured in image 602. Capturing may be performed by, for example, capture device 204. The same human face is subsequently captured in image 606, but the data, including the particular pixels, comprising human face 604b is not identical to that of image 602.

In 610, intensity map 615a illustrates intensities of some pixels in image 602. Exemplary pixel groups 612a, 616a, 618a, and 620a are comprised of individual pixels and represent some areas of pixel intensities for image 602. A pattern of dots is used to indicate the level of intensity of the pixels in that pixel group. The pixel intensities as shown vary in pattern density, with higher intensity being represented by a greater pattern density. Thus, pixel group 618a has a higher intensity than pixel group 620a, which in turn has a higher intensity than pixel group 616a, which in turn has a higher pixel intensity than pixel group 612a. While the pixel groups shown reflect contiguous pixels sharing the same level of pixel intensity, pixels of the same image may share an intensity level without being adjacent. Furthermore, while a subset of the overall pixels of image 602 is shown, the pixels of the entire image may be analyzed, or particular regions may be analyzed. These regions may be designated by user selection or determined using the pixel intensity values. For example, background pixels may be disregarded after it is determined that all the background pixels have a certain intensity value or that they fall into a certain intensity value range.

In 614, intensity map 615b shows the pixel intensities of the corresponding pixels of image 606. Thus, the pixels in pixel group 616b have higher pixel intensities than the corresponding pixels in pixel group 616a, whereas the pixels in pixel group 618b have lower pixel intensities than corresponding pixels in pixel group 618a. The pixels in pixel group 612b have a higher pixel intensity than the corresponding pixels of pixel group 612a, and the pixels of pixel group 620b have a lower pixel intensity than the corresponding pixels of pixel group 620a. Considered as subsequent images, some areas of human face 604a have had an increase in pixel intensity while others have decreased or stayed the same.

In 628, delta image 629 is comprised of the differences in corresponding pixels between intensity map 615a and intensity map 615b. Thus, for pixel groups where the difference is large, a denser pattern is shown. Shading is used to indicate whether the pixel intensity of the pixel increased or decreased. For example, pixel group 630 has a moderate density reflecting the moderate change in pixel intensity, but is also shaded darkly to indicate an increase in pixel intensity. For pixel group 632, the pattern is dense and lightly shaded, indicating a more significant decrease in pixel intensity. Pixel group 634 has a low pattern density and is lightly shaded, indicating a small decrease in pixel intensity. Pixel group 636 has a low pattern density and is shaded darkly, indicating a small increase in pixel intensity.

Pixel intensity may be evaluated on a range of values. For example, the scale may be from 0 to 65535. Each pixel intensity value may correspond to a unique indicator of the pixel intensity value. For example, each pixel intensity value may correspond to a unique color. The intensity may then be rendered as the corresponding color for the pixel. Furthermore, a change of each amount from the lower bound of the range to the upper bound of the range may correspond to a change in a measure indicating the degree of change. For example, if pixel intensity is a color, the degree of change may be indicated by how bold the color is. Additionally, the pixel intensity value, instead of corresponding to a unique indicator, may fall within a range of values tied to a unique indicator. For example, a pixel with the intensity value of 15,000-25,000 may be assigned to a specific color. Ranges of values may also be used for the degree of change. For example, a change of 3,000-5,000 may indicate a certain level of boldness.

While pattern density is shown in FIG. 5A to indicate and communicate a level of pixel intensity, it should be appreciated that pixel intensity changes could be represented in a variety of ways. For example, changes of increased intensity may be represented in a delta image with one color and while decreases in intensity are represented with another, with the boldness of the color indicating the relative increase or decrease in intensity. For example, red may be used to indicate an increase in pixel intensity and green a decrease in pixel intensity. This may be achieved by correlating pixel intensity values with ranges of a color model, such as the RGB or CMYK color models. In another example, pixel intensity values may be tied to the entire range of a color model, with increases in intensity corresponding to a change in a value or values of a color model, and decreases in intensity corresponding to a different change in a value or values of a color model.

Figure 5B:
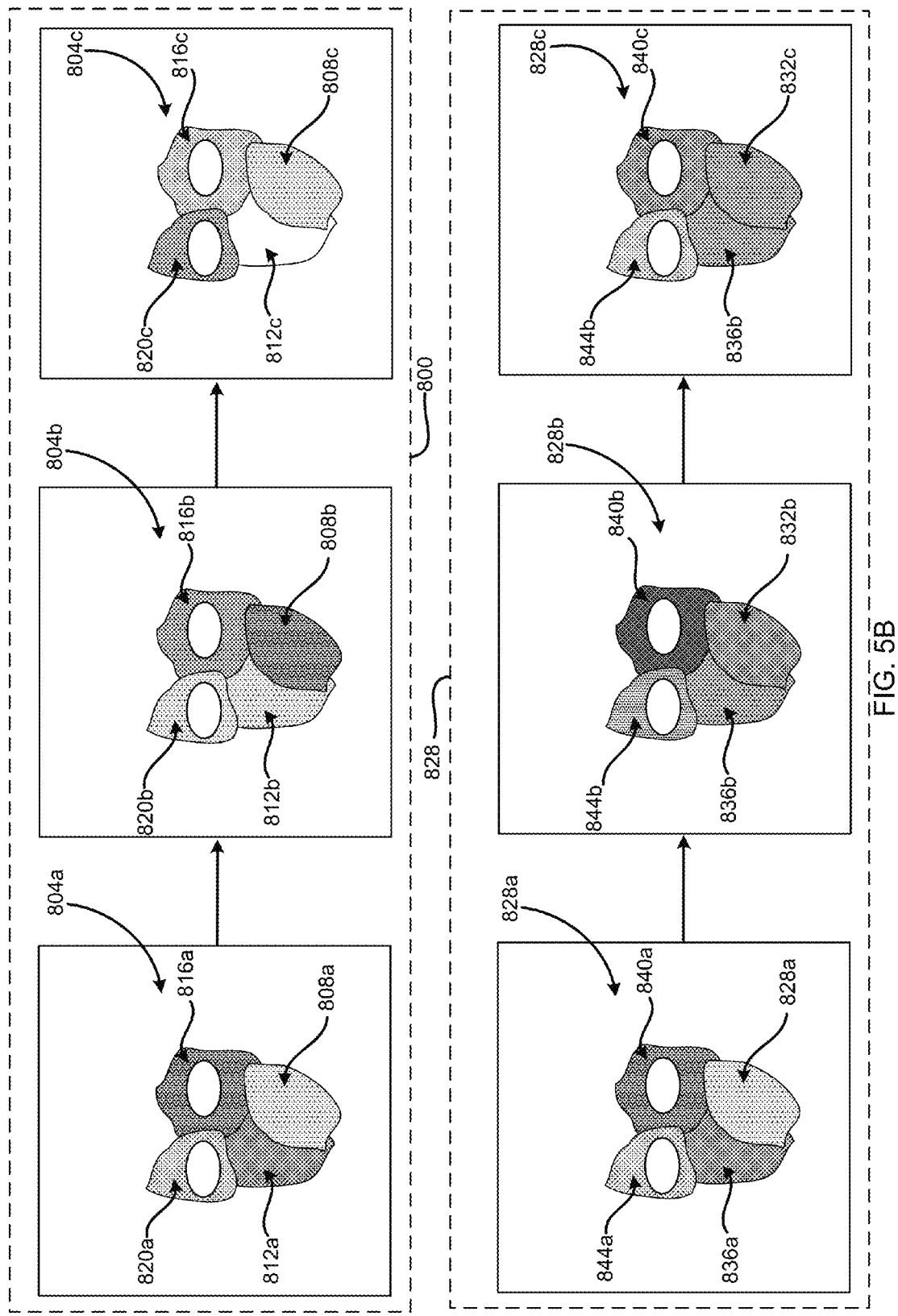
FIG. 5B shows an illustrative example of a skin blood flow visualization of a human face.

FIG. 5B illustrates a visualization of a blood flow in a human face. In FIG. 5B, delta images 804a, 804b, and 804c comprise series of delta images 800 of a human face. Delta image 804a precedes delta image 804b, which precedes delta image 804c. Delta images 804a, 804b, and 804c are generated by comparing the pixel intensities of a captured image of the human face at subsequent times, as shown in FIG. 5A. Delta image 804a may be generated from the difference in pixel intensity values from a first image to a second image. Delta image 804b may be generated from the change in pixel intensity values from the second image to a third image. Delta image 804c may be generated from the change in pixel intensity values from the third image to a fourth image.

Delta image 804a is comprised of pixels with intensity values. The pixels are shown divided into pixel groups 808a, 812a, 816a, and 820a. Pixels in each pixel group share the same intensity value as the other pixels in the group. It should be appreciated that while pixel groups are shown, each individual pixel may be treated individually. Pixel groups of the delta image are shaded lightly for a decrease in pixel intensity of the corresponding pixels of the image of the human face, while darkly shaded pixel groups indicate an increase in pixel intensity. Pixel groups with a tight dot pattern reflect a relatively more significant change, while a less tight dot pattern indicates a less significant change. Delta images 804b is similarly divided into pixel groups 808b, 812b, 816b, 820b, and 824b. Delta image 804c is similarly divided into pixel groups 808c, 812c, 816c, and 820c.

Integrated delta images 828a, 828b, and 828c comprise integrated delta image series 828. Integrated delta image 828a comprises the pixel intensity values of delta image 804a. Thus, the pixel intensity values in pixel group 828a equal the corresponding pixel intensity values in pixel group 808a, the pixel intensity values in pixel group 836a equal the corresponding pixel intensity values in pixel group 812a, the pixel intensity values in pixel group 840a equal the corresponding pixel intensity values in pixel group 816a, and the pixel intensity values in pixel group 844a equal to the corresponding pixel intensity values in pixel group 820a.

The pixel intensity values of pixel group 832b equal the corresponding pixel intensity values of pixel group 808b added to the corresponding pixel intensity values of pixel group 828a. The pixel intensity values of pixel group 836b equal the corresponding pixel intensity values of pixel group 812b added to the corresponding pixel intensity values of pixel group 836a. The pixel intensity values of pixel group 840b equal the corresponding pixel intensity values of pixel group 816b added to the corresponding pixel intensity values of pixel group 840a. The pixel intensity values of pixel group 844b equal the corresponding pixel intensity values of pixel group 820b added to the corresponding pixel intensity values of pixel group 844a.

In turn, for integrated delta image 828c, the pixel intensity values of pixel group 832c equal the corresponding pixel intensity values of pixel group 808c added to the corresponding pixel intensity values of pixel group 828b. The pixel intensity values of pixel group 836c equal the corresponding pixel intensity values of pixel group 812c added to the corresponding pixel intensity values of pixel group 836b. The pixel intensity values of pixel group 840c equal the corresponding pixel intensity values of pixel group 816b added to the corresponding pixel intensity values of pixel group 840*b*. The pixel intensity values of pixel group 844*c* equal the corresponding pixel intensity values of pixel group 820*c* added to the corresponding pixel intensity values of pixel group 844*b*.

This may continue for subsequent images and integrated delta image series 828 may be rendered and displayed. Integrated delta image series 828 may correspond to the blood flow in the human face in the images. For example, integrated delta image series 828 may correspond to the blood flow of user 220 in FIG. 2. Images of the face of user 220 captured by capture device 204 may be used in generating the requisite delta images which in turn are used in generating the integrated delta images comprising integrated delta image series 828. Integrated delta image series 828 may then be rendered and displayed using display 208 in blood flow visualization application 216.

Figure 6:
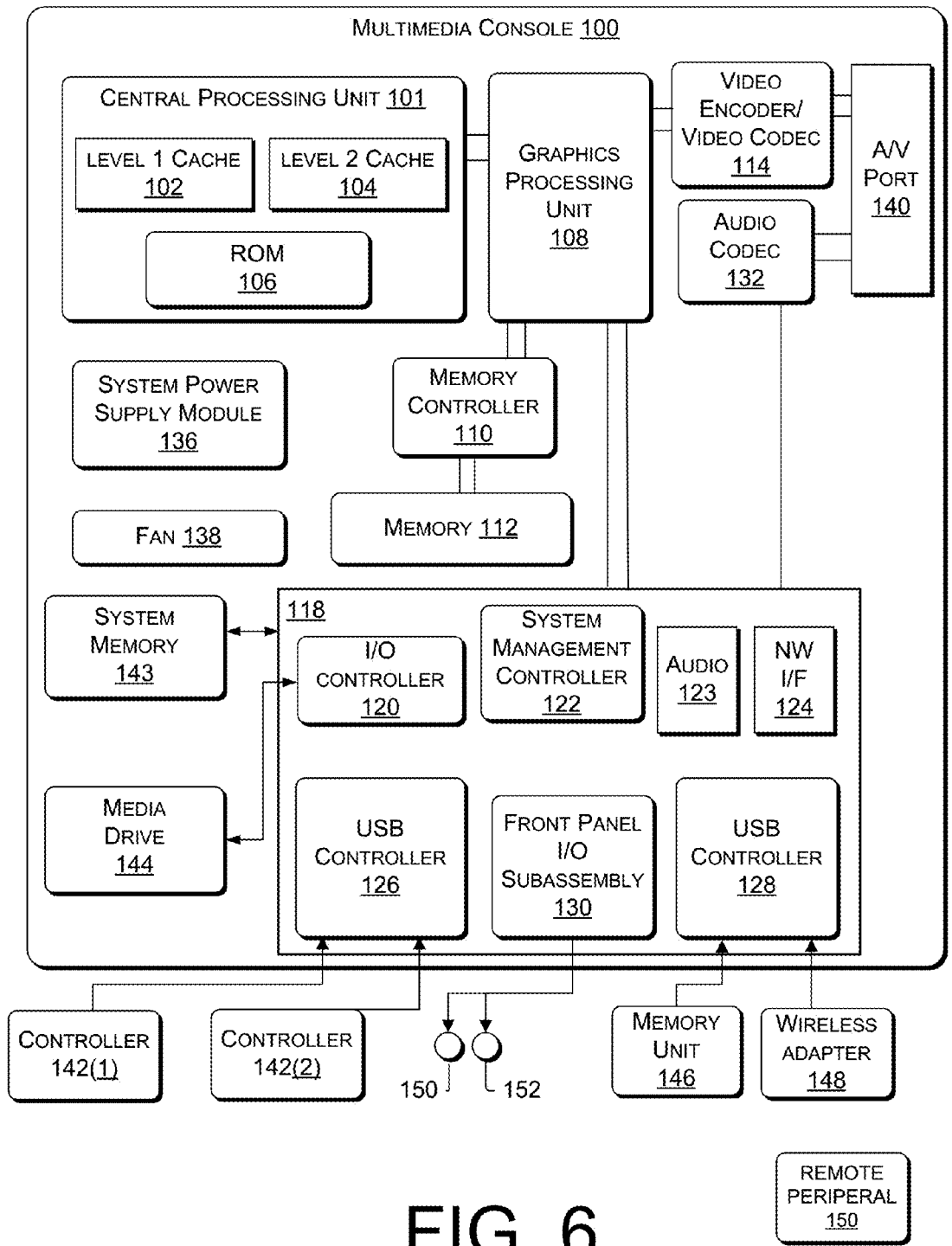
FIG. 6 shows a block diagram of an illustrative multimedia console that may be used in part to implement the present skin blood flow visualization.
Figure 7:
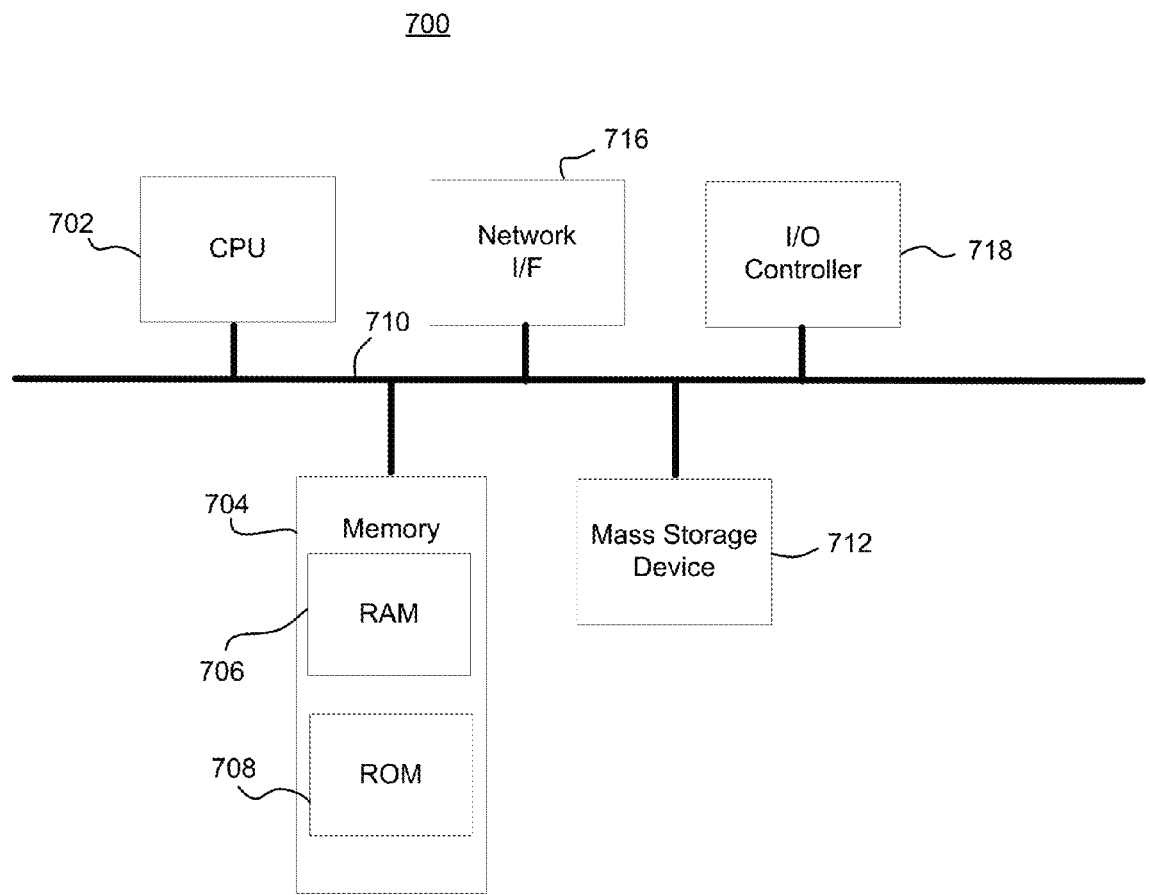
FIG. 7 shows a block diagram of an illustrative computing platform that may be used in part to implement skin blood flow visualization.

FIG. 6 shows a block diagram of illustrative multimedia console 100 that may be used in part to implement the present skin blood flow visualization. FIG. 7 is an illustrative functional block diagram of multimedia console 100 shown in FIG. 1. As shown in FIG. 7, multimedia console 100 has a central processing unit (CPU) 101 having a level 1 cache 102, a level 2 cache 104, and a Flash ROM (Read Only Memory) 106. The level 1 cache 102 and the level 2 cache 104 temporarily store data and hence reduce the number of memory access cycles, thereby improving processing speed and throughput. The CPU 101 may be configured with more than one core, and thus, additional level 1 and level 2 caches 102 and 104. The Flash ROM 106 may store executable code that is loaded during an initial phase of a boot process when the multimedia console 100 is powered ON.

A graphics processing unit (GPU) 108 and a video encoder/video codec (coder/decoder) 114 form a video processing pipeline for high speed and high resolution graphics processing. Data is carried from the GPU 108 to the video encoder/video codec 114 via a bus. The video processing pipeline outputs data to an A/V (audio/video) port 140 for transmission to a television or other display. A memory controller 110 is connected to the GPU 108 to facilitate processor access to various types of memory 112, such as, but not limited to, a RAM.

Multimedia console 100 includes an I/O controller 120, a system management controller 122, an audio processing unit 123, a network interface controller 124, a first USB host controller 126, a second USB controller 128, and a front panel I/O subassembly 130 that may be implemented on a module 118. The USB controllers 126 and 128 serve as hosts for peripheral controllers 142(1)-142(2), a wireless adapter 148, and an external memory device 146 (e.g., Flash memory, external CD/DVD ROM drive, removable media, etc.). The network interface controller 124 and/or wireless adapter 148 provide access to a network (e.g., the Internet, home network, etc.) and may be any of a wide variety of various wired or wireless adapter components including an Ethernet card, a modem, a Bluetooth module, a cable modem, and the like.

System memory 143 is provided to store application data that is loaded during the boot process. A media drive 144 is provided and may comprise a DVD/CD drive, hard drive, or other removable media drive, etc. The media drive 144 may be internal or external to the multimedia console 100. Application data may be accessed via the media drive 144 for execution, playback, etc. by the multimedia console 100. The media drive 144 is connected to the I/O controller 120 via a bus, such as a Serial ATA bus or other high speed connection (e.g., IEEE 1394).

The system management controller 122 provides a variety of service functions related to assuring availability of the multimedia console 100. The audio processing unit 123 and an audio codec 132 form a corresponding audio processing pipeline with high fidelity and stereo processing. Audio data is carried between the audio processing unit 123 and the audio codec 132 via a communication link. The audio processing pipeline outputs data to the A/V port 140 for reproduction by an external audio player or device having audio capabilities.

The front panel I/O subassembly 130 supports the functionality of the power button 150 and the eject button 152, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 100 is powered ON, application data may be loaded from the system memory 143 into memory 112 and/or caches 102 and 104 and executed on the CPU 101. The application may present a graphical user interface that provides a consistent user experience when navigating to different media types available on the multimedia console 100. In operation, applications and/or other media contained within the media drive 144 may be launched or played from the media drive 144 to provide additional functionalities to the multimedia console 100.

The multimedia console 100 may be operated as a standalone system by simply connecting the system to a television or other display. In this standalone mode, the multimedia console 100 allows one or more users to interact with the system, watch movies, or listen to music. However, with the integration of broadband connectivity made available through the network interface controller 124 or the wireless adapter 148, the multimedia console 100 may further be operated as a participant in a larger network community.

When the multimedia console 100 is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 kbs), etc. Because these resources are reserved at system boot time, the reserved resources do not exist from the application's view.

In particular, the memory reservation may be large enough to contain the launch kernel, concurrent system applications, and drivers. The CPU reservation may be constant such that if the reserved CPU usage is not used by the system applications, an idle thread will consume any unused cycles.

With regard to the GPU reservation, lightweight messages generated by the system applications (e.g., pop-ups) are displayed by using a GPU interrupt to schedule code to render pop-ups into an overlay. The amount of memory required for an overlay depends on the overlay area size and the overlay may scale with screen resolution. Where a full user interface is used by the concurrent system application, it is possible to use a resolution independent of application resolution. A scaler may be used to set this resolution such that the need to change frequency and cause a TV re-sync is eliminated.

After multimedia console 100 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications may be scheduled to run on CPU 101 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 142(1) and 142(2)) are shared by gaming applications and system applications. The input devices are not reserved resources, but are to be switched between system applications and the gaming application such that each will have a focus of the device. The application manager may control the switching of input stream, without knowledge of the gaming application's knowledge and a driver maintains state information regarding focus switches. Capture device 204 may define additional input devices for console 100.

It may be desirable and/or advantageous to enable other types of computing platforms other than the illustrative media console 100 to implement skin blood flow visualization in some applications. For example, skin blood flow visualization may be readily adapted to run on fixed computing platforms and mobile computing platforms that have video capture capabilities. FIG. 7 shows one illustrative architecture 700 for a computing platform or device capable of executing the various components described herein for providing skin blood flow visualization. Thus, the architecture 700 illustrated in FIG. 7 shows an architecture that may be adapted for a server computer, mobile phone, a PDA (personal digital assistant), a smart phone, a desktop computer, a netbook computer, a tablet computer, GPS (Global Positioning System) device, gaming console, and/or a laptop computer. The architecture 700 may be utilized to execute any aspect of the components presented herein.

The architecture 700 illustrated in FIG. 7 includes a CPU 702, a system memory 704, including a RAM 706 and a ROM 708, and a system bus 710 that couples the memory 704 to the CPU 702. A basic input/output system containing the basic routines that help to transfer information between elements within the architecture 700, such as during startup, is stored in the ROM 708. The architecture 700 further includes a mass storage device 712 for storing software code or other computer-executed code that is utilized to implement applications, the motion tracking engine, the gesture recognition engine, the depth image processing engine, and the operating system which may configured with functionality and operations in a similar manner to those components shown in FIG. 3 and described in the accompanying text.

The mass storage device 712 is connected to the CPU 702 through a mass storage controller (not shown) connected to the bus 710. The mass storage device 712 and its associated computer-readable storage media provide non-volatile storage for the architecture 700. Although the description of computer-readable storage media contained herein refers to a mass storage device, such as a hard disk or CD-ROM drive, it should be appreciated by those skilled in the art that computer-readable media can be any available computer storage media that can be accessed by the architecture 700.

Although the description of computer-readable storage media contained herein refers to a mass storage device, such as a hard disk or CD-ROM drive, it should be appreciated by those skilled in the art that computer-readable storage media can be any available storage media that can be accessed by the architecture 700.

By way of example, and not limitation, computer-readable storage media may include volatile and non-volatile, removable and non-removable media implemented in any method or technology for storage of information such as computer-readable instructions, data structures, program modules or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVDs, HD-DVD (High Definition DVD), BLU-RAY, or other optical storage, magnetic cassettes, magnetic tape, magnetic disk storage or other magnetic storage devices, or any other medium which can be used to store the desired information and which can be accessed by the architecture 700. The memory may comprise a storage medium having a concrete, tangible, physical structure. As is known, a signal does not have a concrete, tangible, physical structure. Memory, as well as any computer-readable storage medium described herein, is not to be construed as a signal. The memory, as well as any computer-readable storage medium described herein, is not to be construed as a transient signal. The memory, as well as any computer-readable storage medium described herein, is not to be construed as a propagating signal. The memory, as well as any computer-readable storage medium described herein, is to be construed as an article of manufacture.

According to various aspects, the architecture 700 may operate in a networked environment using logical connections to remote computers through a network. The architecture 700 may connect to the network through a network interface unit 716 connected to the bus 710. It should be appreciated that the network interface unit 716 also may be utilized to connect to other types of networks and remote computer systems. The architecture 700 also may include an input/output controller 718 for receiving and processing input from a number of other devices, including a keyboard, mouse, or electronic stylus (not shown in FIG. 7). Similarly, the input/output controller 718 may provide output to a display screen, a printer, or other type of output device (also not shown in FIG. 7).

It should be appreciated that the software components described herein may, when loaded into the CPU 702 and executed, transform the CPU 702 and the overall architecture 700 from a general-purpose computing system into a special-purpose computing system customized to facilitate the functionality presented herein. The CPU 702 may be constructed from any number of transistors or other discrete circuit elements, which may individually or collectively assume any number of states. More specifically, the CPU 702 may operate as a finite-state machine, in response to executable instructions contained within the software modules disclosed herein. These computer-executable instructions may transform the CPU 702 by specifying how the CPU 702 transitions between states, thereby transforming the transistors or other discrete hardware elements constituting the CPU 702.

Encoding the software modules presented herein also may transform the physical structure of the computer-readable storage media presented herein. The specific transformation of physical structure may depend on various factors, in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the architecture 700 in order to store and execute the software components presented herein. It also should be appreciated that the architecture 700 may include other types of computing devices, including hand-held computers, embedded computer systems, smartphones, PDAs, and other types of computing devices known to those skilled in the art. It is also contemplated that the architecture 700 may not include all of the components shown in FIG. 7, may include other components that are not explicitly shown in FIG. 7, or may utilize an architecture completely different from that shown in FIG. 7.

Exemplary Aspects

An aspect of the invention may be a method in which a plurality of differences in intensity is determined between each pixel of a plurality of pixels of an image and each corresponding pixel of a subsequent image. In this aspect, a "delta" image is generated of the differences in pixel intensity. For each subsequent comparison, an integrated delta image is generated of the differences in intensity of the delta image and the corresponding differences in intensity of the subsequent delta image. A visual contrast of the integrated delta image is enhanced to accentuate a characteristic associated with it, and it is visually rendered, as well as each subsequent integrated delta image generated by each subsequent comparison.

An aspect of the invention may be a method in which a plurality of differences in intensity is determined between each pixel of a plurality of pixels of an image and each corresponding pixel of a subsequent image. In this aspect, a "delta" image is generated of the differences in pixel intensity. For each subsequent comparison, an integrated delta image is generated of the differences in intensity of the delta image and the corresponding differences in intensity of the subsequent delta image. A visual contrast of the integrated delta image is enhanced to accentuate a characteristic associated with it, and it is visually rendered, as well as each subsequent integrated delta image generated by each subsequent comparison. In this aspect, bias correction is applied to the integrated delta image.

An aspect of the invention may be a method in which a plurality of differences in intensity is determined between each pixel of a plurality of pixels of an image and each corresponding pixel of a subsequent image. In this aspect, the pixel intensity is the intensity of a specific color channel. In this aspect, a "delta" image is generated of the differences in pixel intensity. For each subsequent comparison, an integrated delta image is generated of the differences in intensity of the delta image and the corresponding differences in intensity of the subsequent delta image. A visual contrast of the integrated delta image is enhanced to accentuate a characteristic associated with it, and it is visually rendered, as well as each subsequent integrated delta image generated by each subsequent comparison.

An aspect of the invention may be a method in which a plurality of differences in intensity is determined between each pixel of a plurality of pixels of an image and each corresponding pixel of a subsequent image. In this aspect, the pixel intensity is the intensity of a specific color channel. In this aspect, a "delta" image is generated of the differences in pixel intensity. For each subsequent comparison, an integrated delta image is generated of the differences in intensity of the delta image and the corresponding differences in intensity of the subsequent delta image. A visual contrast of the integrated delta image is enhanced to accentuate a characteristic associated with it, and it is visually rendered, as well as each subsequent integrated delta image generated by each subsequent comparison. In this aspect, bias correction is applied to the integrated delta image.

An aspect of the invention may be a method in which a plurality of differences in intensity is determined between each pixel of a plurality of pixels of an image and each corresponding pixel of a subsequent image. In this aspect, the pixel intensity is the intensity of the infrared color channel. In this aspect, a "delta" image is generated of the differences in pixel intensity. For each subsequent comparison, an integrated delta image is generated of the differences in intensity of the delta image and the corresponding differences in intensity of the subsequent delta image. A visual contrast of the integrated delta image is enhanced to accentuate a characteristic associated with it, and it is visually rendered, as well as each subsequent integrated delta image generated by each subsequent comparison.

An aspect of the invention may be a method in which a plurality of differences in intensity is determined between each pixel of a plurality of pixels of an image and each corresponding pixel of a subsequent image. In this aspect, the pixel intensity is the intensity of the infrared color channel. In this aspect, a "delta" image is generated of the differences in pixel intensity. For each subsequent comparison, an integrated delta image is generated of the differences in intensity of the delta image and the corresponding differences in intensity of the subsequent delta image. A visual contrast of the integrated delta image is enhanced to accentuate a characteristic associated with it, and it is visually rendered, as well as each subsequent integrated delta image generated by each subsequent comparison. In this aspect, bias correction is applied to the integrated delta image.

An aspect of the invention may be a method in which a plurality of differences in intensity is determined between each pixel of a plurality of pixels of an image and each corresponding pixel of a subsequent image. The images in this aspect are captured by a capture device. In this aspect, a "delta" image is generated of the differences in pixel intensity. For each subsequent comparison, an integrated delta image is generated of the differences in intensity of the delta image and the corresponding differences in intensity of the subsequent delta image. A visual contrast of the integrated delta image is enhanced to accentuate a characteristic associated with it, and it is visually rendered, as well as each subsequent integrated delta image generated by each subsequent comparison.

An aspect of the invention may be a method in which a plurality of differences in intensity is determined between each pixel of a plurality of pixels of an image and each corresponding pixel of a subsequent image. In this aspect, a "delta" image is generated of the differences in pixel intensity. For each subsequent comparison, an integrated delta image is generated of the differences in intensity of the delta image and the corresponding differences in intensity of the subsequent delta image. A visual contrast of the integrated delta image is enhanced to accentuate a characteristic associated with it, and it is visually rendered, as well as each subsequent integrated delta image generated by each subsequent comparison. In this aspect, bias correction is applied to the integrated delta image.

An aspect of the invention may be a method in which a plurality of differences in intensity is determined between each pixel of a plurality of pixels of an image and each corresponding pixel of a subsequent image. In this aspect, the pixel intensity is the intensity of a specific color channel. In this aspect, a "delta" image is generated of the differences in pixel intensity. For each subsequent comparison, an integrated delta image is generated of the differences in intensity of the delta image and the corresponding differences in intensity of the subsequent delta image. A visual contrast of the integrated delta image is enhanced to accentuate a characteristic associated with it, and it is visually rendered, as well as each subsequent integrated delta image generated by each subsequent comparison.

An aspect of the invention may be a method in which a plurality of differences in intensity is determined between each pixel of a plurality of pixels of an image and each corresponding pixel of a subsequent image. In this aspect, the pixel intensity is the intensity of the infrared color channel. In this aspect, a "delta" image is generated of the differences in pixel intensity. For each subsequent comparison, an integrated delta image is generated of the differences in intensity of the delta image and the corresponding differences in intensity of the subsequent delta image. A visual contrast of the integrated delta image is enhanced to accentuate a characteristic associated with it, and it is visually rendered, as well as each subsequent integrated delta image generated by each subsequent comparison.

An aspect of the invention may be a method in which a plurality of differences in intensity is determined between each pixel of a plurality of pixels of an image and each corresponding pixel of a subsequent image. In this aspect, the pixel intensity is the intensity of a specific color channel. In this aspect, a "delta" image is generated of the differences in pixel intensity. For each subsequent comparison, an integrated delta image is generated of the differences in intensity of the delta image and the corresponding differences in intensity of the subsequent delta image. A visual contrast of the integrated delta image is enhanced to accentuate a characteristic associated with it, and it is visually rendered, as well as each subsequent integrated delta image generated by each subsequent comparison. In this aspect, bias correction is applied to the integrated delta image.

An aspect of the invention may be a method in which a plurality of differences in intensity is determined between each pixel of a plurality of pixels of an image and each corresponding pixel of a subsequent image. In this aspect, the pixel intensity is the intensity of the infrared color channel. In this aspect, a "delta" image is generated of the differences in pixel intensity. For each subsequent comparison, an integrated delta image is generated of the differences in intensity of the delta image and the corresponding differences in intensity of the subsequent delta image. A visual contrast of the integrated delta image is enhanced to accentuate a characteristic associated with it, and it is visually rendered, as well as each subsequent integrated delta image generated by each subsequent comparison. In this aspect, bias correction is applied to the integrated delta image.

An aspect of the invention may be a method in which a plurality of differences in intensity is determined between each pixel of a plurality of pixels of an image of a human face and each corresponding pixel of a subsequent image of the human face. In this aspect, a "delta" image is generated of the differences in pixel intensity. For each subsequent comparison, an integrated delta image is generated of the differences in intensity of the delta image and the corresponding differences in intensity of the subsequent delta image. A visual contrast of the integrated delta image is enhanced to accentuate a characteristic associated with it, and it is visually rendered, as well as each subsequent integrated delta image generated by each subsequent comparison.

An aspect of the invention may be a method in which a plurality of differences in intensity is determined between each pixel of a plurality of pixels of an image of a human face and each corresponding pixel of a subsequent image of the human face. In this aspect, a "delta" image is generated of the differences in pixel intensity. For each subsequent comparison, an integrated delta image is generated of the differences in intensity of the delta image and the corresponding differences in intensity of the subsequent delta image. A visual contrast of the integrated delta image is enhanced to accentuate a characteristic associated with it, and it is visually rendered, as well as each subsequent integrated delta image generated by each subsequent comparison.

An aspect of the invention may be a method in which a plurality of differences in intensity is determined between each pixel of a plurality of pixels of an image of a human face and each corresponding pixel of a subsequent image of the human face. In this aspect, the pixel intensity is the intensity of a specific color channel. In this aspect, a "delta" image is generated of the differences in pixel intensity. For each subsequent comparison, an integrated delta image is generated of the differences in intensity of the delta image and the corresponding differences in intensity of the subsequent delta image. A visual contrast of the integrated delta image is enhanced to accentuate a characteristic associated with it, and it is visually rendered, as well as each subsequent integrated delta image generated by each subsequent comparison.

An aspect of the invention may be a method in which a plurality of differences in intensity is determined between each pixel of a plurality of pixels of an image of a human face and each corresponding pixel of a subsequent image of the human face. In this aspect, the pixel intensity is the intensity of the infrared color channel. In this aspect, a "delta" image is generated of the differences in pixel intensity. For each subsequent comparison, an integrated delta image is generated of the differences in intensity of the delta image and the corresponding differences in intensity of the subsequent delta image. A visual contrast of the integrated delta image is enhanced to accentuate a characteristic associated with it, and it is visually rendered, as well as each subsequent integrated delta image generated by each subsequent comparison.

An aspect of the invention may be a method in which a plurality of differences in intensity is determined between each pixel of a plurality of pixels of an image of a human face and each corresponding pixel of a subsequent image of a human face. The images in this aspect are captured by a capture device. In this aspect, a "delta" image is generated of the differences in pixel intensity. For each subsequent comparison, an integrated delta image is generated of the differences in intensity of the delta image and the corresponding differences in intensity of the subsequent delta image. A visual contrast of the integrated delta image is enhanced to accentuate a characteristic associated with it, and it is visually rendered, as well as each subsequent integrated delta image generated by each subsequent comparison.

An aspect of the invention may be a method in which a plurality of differences in intensity is determined between each pixel of a plurality of pixels of an image of a human face and each corresponding pixel of a subsequent image of the human face. In this aspect, the pixel intensity is the intensity of a specific color channel. In this aspect, a "delta" image is generated of the differences in pixel intensity. For each subsequent comparison, an integrated delta image is generated of the differences in intensity of the delta image and the corresponding differences in intensity of the subsequent delta image. A visual contrast of the integrated delta image is enhanced to accentuate a characteristic associated with it, and it is visually rendered, as well as each subsequent integrated delta image generated by each subsequent comparison. In this aspect, bias correction is applied to the integrated delta image.

An aspect of the invention may be a method in which a plurality of differences in intensity is determined between each pixel of a plurality of pixels of an image of a human face and each corresponding pixel of a subsequent image of the human face. In this aspect, the pixel intensity is the intensity of the infrared color channel. In this aspect, a "delta" image is generated of the differences in pixel intensity. For each subsequent comparison, an integrated delta image is generated of the differences in intensity of the delta image and the corresponding differences in intensity of the subsequent delta image. A visual contrast of the integrated delta image is enhanced to accentuate a characteristic associated with it, and it is visually rendered, as well as each subsequent integrated delta image generated by each subsequent comparison. In this aspect, bias correction is applied to the integrated delta image.

An aspect of the invention may be a method in which a plurality of differences in intensity is determined between each pixel of a plurality of pixels of an image of a human face and each corresponding pixel of a subsequent image of the human face. In this aspect, the pixel intensity is the intensity of the infrared color channel. In this aspect, a "delta" image is generated of the differences in pixel intensity. For each subsequent comparison, an integrated delta image is generated of the differences in intensity of the delta image and the corresponding differences in intensity of the subsequent delta image. A visual contrast of the integrated delta image is enhanced to accentuate a characteristic associated with it, and it is visually rendered, as well as each subsequent integrated delta image generated by each subsequent comparison. In this aspect, bias correction is applied to the integrated delta image.

An aspect of the invention may be a method in which a plurality of differences in intensity is determined between each pixel of a plurality of pixels of an image of a human face and each corresponding pixel of a subsequent image of the human face. In this aspect, the pixel intensity is the intensity of a specific color channel. In this aspect, a "delta" image is generated of the differences in pixel intensity. For each subsequent comparison, an integrated delta image is generated of the differences in intensity of the delta image and the corresponding differences in intensity of the subsequent delta image. A visual contrast of the integrated delta image is enhanced to accentuate a characteristic associated with it, and it is visually rendered, as well as each subsequent integrated delta image generated by each subsequent comparison.

An aspect of the invention may be a method in which a plurality of differences in intensity is determined between each pixel of a plurality of pixels of an image of a human face and each corresponding pixel of a subsequent image of the human face. In this aspect, the pixel intensity is the intensity of the infrared color channel. In this aspect, a "delta" image is generated of the differences in pixel intensity. For each subsequent comparison, an integrated delta image is generated of the differences in intensity of the delta image and the corresponding differences in intensity of the subsequent delta image. A visual contrast of the integrated delta image is enhanced to accentuate a characteristic associated with it, and it is visually rendered, as well as each subsequent integrated delta image generated by each subsequent comparison.

An aspect of the invention may be a method in which a plurality of differences in intensity is determined between each pixel of a plurality of pixels of an image of a human face and each corresponding pixel of a subsequent image of the human face. In this aspect, the pixel intensity is the intensity of a specific color channel. In this aspect, a "delta" image is generated of the differences in pixel intensity. For each subsequent comparison, an integrated delta image is generated of the differences in intensity of the delta image and the corresponding differences in intensity of the subsequent delta image. A visual contrast of the integrated delta image is enhanced to accentuate a characteristic associated with it, and it is visually rendered, as well as each subsequent integrated delta image generated by each subsequent comparison. In this aspect, bias correction is applied to the integrated delta image.

An aspect of the invention may be a method in which a plurality of differences in intensity is determined between each pixel of a plurality of pixels of an image of a human face and each corresponding pixel of a subsequent image of the human face. In this aspect, the pixel intensity is the intensity of the infrared color channel. In this aspect, a "delta" image is generated of the differences in pixel intensity. For each subsequent comparison, an integrated delta image is generated of the differences in intensity of the delta image and the corresponding differences in intensity of the subsequent delta image. A visual contrast of the integrated delta image is enhanced to accentuate a characteristic associated with it, and it is visually rendered, as well as each subsequent integrated delta image generated by each subsequent comparison.

An aspect of the invention may be a method in which a plurality of differences in intensity is determined between each pixel of a plurality of pixels of an image of a human face and each corresponding pixel of a subsequent image of the human face. In this aspect, the pixel intensity is the intensity of a specific color channel. In this aspect, a "delta" image is generated of the differences in pixel intensity. For each subsequent comparison, an integrated delta image is generated of the differences in intensity of the delta image and the corresponding differences in intensity of the subsequent delta image. A visual contrast of the integrated delta image is enhanced to accentuate a characteristic associated with it, and it is visually rendered, as well as each subsequent integrated delta image generated by each subsequent comparison. In this aspect, bias correction is applied to the integrated delta image.

An aspect of the invention may be a method in which a plurality of differences in intensity is determined between each pixel of a plurality of pixels of an image of a human face and each corresponding pixel of a subsequent image of the human face. In this aspect, the pixel intensity is the intensity of the infrared color channel. In this aspect, a "delta" image is generated of the differences in pixel intensity. For each subsequent comparison, an integrated delta image is generated of the differences in intensity of the delta image and the corresponding differences in intensity of the subsequent delta image. A visual contrast of the integrated delta image is enhanced to accentuate a characteristic associated with it, and it is visually rendered, as well as each subsequent integrated delta image generated by each subsequent comparison.

An aspect of the invention may be a method in which a plurality of differences in intensity is determined between each pixel of a plurality of pixels of an image of a human face and each corresponding pixel of a subsequent image of the human face. In this aspect, a "delta" image is generated of the differences in pixel intensity. For each subsequent comparison, an integrated delta image representing blood flow in the human face is generated of the differences in intensity of the delta image and the corresponding differences in intensity of the subsequent delta image. A visual contrast of the integrated delta image is enhanced to accentuate a characteristic associated with it, and it is visually rendered, as well as each subsequent integrated delta image generated by each subsequent comparison.

An aspect of the invention may be a method in which a plurality of differences in intensity is determined between each pixel of a plurality of pixels of an image of a human face and each corresponding pixel of a subsequent image of the human face. In this aspect, a "delta" image is generated of the differences in pixel intensity. For each subsequent comparison, an integrated delta image representing blood flow in the human face is generated of the differences in intensity of the delta image and the corresponding differences in intensity of the subsequent delta image. A visual contrast of the integrated delta image is enhanced to accentuate a characteristic associated with it, and it is visually rendered, as well as each subsequent integrated delta image generated by each subsequent comparison.

An aspect of the invention may be a method in which a plurality of differences in intensity is determined between each pixel of a plurality of pixels of an image of a human face and each corresponding pixel of a subsequent image of the human face. In this aspect, the pixel intensity is the intensity of a specific color channel. In this aspect, a "delta" image is generated of the differences in pixel intensity. For each subsequent comparison, an integrated delta image representing blood flow in the human face is generated of the differences in intensity of the delta image and the corresponding differences in intensity of the subsequent delta image. A visual contrast of the integrated delta image is enhanced to accentuate a characteristic associated with it, and it is visually rendered, as well as each subsequent integrated delta image generated by each subsequent comparison.

An aspect of the invention may be a method in which a plurality of differences in intensity is determined between each pixel of a plurality of pixels of an image of a human face and each corresponding pixel of a subsequent image of the human face. In this aspect, the pixel intensity is the intensity of the infrared color channel. In this aspect, a "delta" image is generated of the differences in pixel intensity. For each subsequent comparison, an integrated delta image representing blood flow in the human face is generated of the differences in intensity of the delta image and the corresponding differences in intensity of the subsequent delta image. A visual contrast of the integrated delta image is enhanced to accentuate a characteristic associated with it, and it is visually rendered, as well as each subsequent integrated delta image generated by each subsequent comparison.

An aspect of the invention may be a method in which a plurality of differences in intensity is determined between each pixel of a plurality of pixels of an image of a human face and each corresponding pixel of a subsequent image of a human face. The images in this aspect are captured by a capture device. In this aspect, a "delta" image is generated of the differences in pixel intensity. For each subsequent comparison, an integrated delta image representing blood flow in the human face is generated of the differences in intensity of the delta image and the corresponding differences in intensity of the subsequent delta image. A visual contrast of the integrated delta image is enhanced to accentuate a characteristic associated with it, and it is visually rendered, as well as each subsequent integrated delta image generated by each subsequent comparison.

An aspect of the invention may be a method in which a plurality of differences in intensity is determined between each pixel of a plurality of pixels of an image of a human face and each corresponding pixel of a subsequent image of the human face. In this aspect, the pixel intensity is the intensity of a specific color channel. In this aspect, a "delta" image is generated of the differences in pixel intensity. For each subsequent comparison, an integrated delta image representing blood flow in the human face is generated of the differences in intensity of the delta image and the corresponding differences in intensity of the subsequent delta image. A visual contrast of the integrated delta image is enhanced to accentuate a characteristic associated with it, and it is visually rendered, as well as each subsequent integrated delta image generated by each subsequent comparison. In this aspect, bias correction is applied to the integrated delta image.

An aspect of the invention may be a method in which a plurality of differences in intensity is determined between each pixel of a plurality of pixels of an image of a human face and each corresponding pixel of a subsequent image of the human face. In this aspect, the pixel intensity is the intensity of the infrared color channel. In this aspect, a "delta" image is generated of the differences in pixel intensity. For each subsequent comparison, an integrated delta image representing blood flow in the human face is generated of the differences in intensity of the delta image and the corresponding differences in intensity of the subsequent delta image. A visual contrast of the integrated delta image is enhanced to accentuate a characteristic associated with it, and it is visually rendered, as well as each subsequent integrated delta image generated by each subsequent comparison. In this aspect, bias correction is applied to the integrated delta image.

An aspect of the invention may be a method in which a plurality of differences in intensity is determined between each pixel of a plurality of pixels of an image of a human face and each corresponding pixel of a subsequent image of the human face. In this aspect, a "delta" image is generated of the differences in pixel intensity. For each subsequent comparison, an integrated delta image representing blood flow in the human face is generated of the differences in intensity of the delta image and the corresponding differences in intensity of the subsequent delta image. A visual contrast of the integrated delta image is enhanced to accentuate a characteristic associated with it, and it is visually rendered, as well as each subsequent integrated delta image generated by each subsequent comparison. In this aspect, bias correction is applied to the integrated delta image.

An aspect of the invention may be a method in which a plurality of differences in intensity is determined between each pixel of a plurality of pixels of an image of a human face and each corresponding pixel of a subsequent image of the human face. In this aspect, the pixel intensity is the intensity of a specific color channel. In this aspect, a "delta" image is generated of the differences in pixel intensity. For each subsequent comparison, an integrated delta image representing blood flow in the human face is generated of the differences in intensity of the delta image and the corresponding differences in intensity of the subsequent delta image. A visual contrast of the integrated delta image is enhanced to accentuate a characteristic associated with it, and it is visually rendered, as well as each subsequent integrated delta image generated by each subsequent comparison.

An aspect of the invention may be a method in which a plurality of differences in intensity is determined between each pixel of a plurality of pixels of an image of a human face and each corresponding pixel of a subsequent image of the human face. In this aspect, the pixel intensity is the intensity of the infrared color channel. In this aspect, a "delta" image is generated of the differences in pixel intensity. For each subsequent comparison, an integrated delta image representing blood flow in the human face is generated of the differences in intensity of the delta image and the corresponding differences in intensity of the subsequent delta image. A visual contrast of the integrated delta image is enhanced to accentuate a characteristic associated with it, and it is visually rendered, as well as each subsequent integrated delta image generated by each subsequent comparison.

An aspect of the invention may be a method in which a plurality of differences in intensity is determined between each pixel of a plurality of pixels of an image of a human face and each corresponding pixel of a subsequent image of the human face. In this aspect, the pixel intensity is the intensity of a specific color channel. In this aspect, a "delta" image is generated of the differences in pixel intensity. For each subsequent comparison, an integrated delta image representing blood flow in the human face is generated of the differences in intensity of the delta image and the corresponding differences in intensity of the subsequent delta image. A visual contrast of the integrated delta image is enhanced to accentuate a characteristic associated with it, and it is visually rendered, as well as each subsequent integrated delta image generated by each subsequent comparison. In this aspect, bias correction is applied to the integrated delta image.

An aspect of the invention may be a method in which a plurality of differences in intensity is determined between each pixel of a plurality of pixels of an image of a human face and each corresponding pixel of a subsequent image of the human face. In this aspect, the pixel intensity is the intensity of the infrared color channel. In this aspect, a "delta" image is generated of the differences in pixel intensity. For each subsequent comparison, an integrated delta image representing blood flow in the human face is generated of the differences in intensity of the delta image and the corresponding differences in intensity of the subsequent delta image. A visual contrast of the integrated delta image is enhanced to accentuate a characteristic associated with it, and it is visually rendered, as well as each subsequent integrated delta image generated by each subsequent comparison.

An aspect of the invention may be a system with a processor and a memory coupled to the processor. The memory has stored on it executable instructions that are executed by the processor cause it to effectuate operations in which a plurality of differences in intensity is determined between each pixel of a plurality of pixels of an image and each corresponding pixel of a subsequent image. In this aspect, a "delta" image is generated of the differences in pixel intensity. A visual contrast of the delta image is enhanced to accentuate a characteristic associated with it, and it is visually rendered, as well as each subsequent delta image generated by each subsequent comparison.

An aspect of the invention may be a system with a processor and a memory coupled to the processor. The memory has stored on it executable instructions that are executed by the processor cause it to effectuate operations in which a plurality of differences in intensity is determined between each pixel of a plurality of pixels of an image and each corresponding pixel of a subsequent image. In this aspect, a "delta" image is generated of the differences in pixel intensity. A visual contrast of the delta image is enhanced to accentuate a characteristic associated with it, and it is visually rendered, as well as each subsequent delta image generated by each subsequent comparison. In this aspect, the delta image is integrated for each subsequent comparison An aspect of the invention may be a system with a processor and a memory coupled to the processor. The memory has stored on it executable instructions that are executed by the processor cause it to effectuate operations in which a plurality of differences in intensity is determined between each pixel of a plurality of pixels of an image and each corresponding pixel of a subsequent image. In this aspect, the pixel intensity is the intensity of a specific color channel. In this aspect, a "delta" image is generated of the differences in pixel intensity. A visual contrast of the delta image is enhanced to accentuate a characteristic associated with it, and it is visually rendered, as well as each subsequent delta image generated by each subsequent comparison.

An aspect of the invention may be a system with a processor and a memory coupled to the processor. The memory has stored on it executable instructions that are executed by the processor cause it to effectuate operations in which a plurality of differences in intensity is determined between each pixel of a plurality of pixels of an image and each corresponding pixel of a subsequent image. In this aspect, the pixel intensity is the intensity of a specific color channel. In this aspect, a "delta" image is generated of the differences in pixel intensity. A visual contrast of the delta image is enhanced to accentuate a characteristic associated with it, and it is visually rendered, as well as each subsequent delta image generated by each subsequent comparison. In this aspect, the delta image is integrated for each subsequent comparison An aspect of the invention may be a system with a processor and a memory coupled to the processor. The memory has stored on it executable instructions that are executed by the processor cause it to effectuate operations in which a plurality of differences in intensity is determined between each pixel of a plurality of pixels of an image and each corresponding pixel of a subsequent image. In this aspect, the pixel intensity is the intensity of the infrared color channel. In this aspect, a "delta" image is generated of the differences in pixel intensity. A visual contrast of the delta image is enhanced to accentuate a characteristic associated with it, and it is visually rendered, as well as each subsequent delta image generated by each subsequent comparison.

An aspect of the invention may be a system with a processor and a memory coupled to the processor. The memory has stored on it executable instructions that are executed by the processor cause it to effectuate operations in which a plurality of differences in intensity is determined between each pixel of a plurality of pixels of an image and each corresponding pixel of a subsequent image. In this aspect, the pixel intensity is the intensity of the infrared color channel. In this aspect, a "delta" image is generated of the differences in pixel intensity. A visual contrast of the delta image is enhanced to accentuate a characteristic associated with it, and it is visually rendered, as well as each subsequent delta image generated by each subsequent comparison. In this aspect, the delta image is integrated for each subsequent comparison An aspect of the invention may be a system with a processor and a memory coupled to the processor. The memory has stored on it executable instructions that are executed by the processor cause it to effectuate operations in which a plurality of differences in intensity is determined between each pixel of a plurality of pixels of an image and each corresponding pixel of a subsequent image. The images in this aspect are captured by a capture device. In this aspect, a "delta" image is generated of the differences in pixel intensity. A visual contrast of the delta image is enhanced to accentuate a characteristic associated with it, and it is visually rendered, as well as each subsequent delta image generated by each subsequent comparison.

An aspect of the invention may be a system with a processor and a memory coupled to the processor. The memory has stored on it executable instructions that are executed by the processor cause it to effectuate operations in which a plurality of differences in intensity is determined between each pixel of a plurality of pixels of an image and each corresponding pixel of a subsequent image. In this aspect, a "delta" image is generated of the differences in pixel intensity. A visual contrast of the delta image is enhanced to accentuate a characteristic associated with it, and it is visually rendered, as well as each subsequent delta image generated by each subsequent comparison. In this aspect, the delta image is integrated for each subsequent comparison An aspect of the invention may be a system with a processor and a memory coupled to the processor. The memory has stored on it executable instructions that are executed by the processor cause it to effectuate operations in which a plurality of differences in intensity is determined between each pixel of a plurality of pixels of an image and each corresponding pixel of a subsequent image. In this aspect, the pixel intensity is the intensity of a specific color channel. In this aspect, a "delta" image is generated of the differences in pixel intensity. A visual contrast of the delta image is enhanced to accentuate a characteristic associated with it, and it is visually rendered, as well as each subsequent delta image generated by each subsequent comparison.

An aspect of the invention may be a system with a processor and a memory coupled to the processor. The memory has stored on it executable instructions that are executed by the processor cause it to effectuate operations in which a plurality of differences in intensity is determined between each pixel of a plurality of pixels of an image and each corresponding pixel of a subsequent image. In this aspect, the pixel intensity is the intensity of the infrared color channel. In this aspect, a "delta" image is generated of the differences in pixel intensity. A visual contrast of the delta image is enhanced to accentuate a characteristic associated with it, and it is visually rendered, as well as each subsequent delta image generated by each subsequent comparison.

An aspect of the invention may be a system with a processor and a memory coupled to the processor. The memory has stored on it executable instructions that are executed by the processor cause it to effectuate operations in which a plurality of differences in intensity is determined between each pixel of a plurality of pixels of an image and each corresponding pixel of a subsequent image. In this aspect, the pixel intensity is the intensity of a specific color channel. In this aspect, a "delta" image is generated of the differences in pixel intensity. A visual contrast of the delta image is enhanced to accentuate a characteristic associated with it, and it is visually rendered, as well as each subsequent delta image generated by each subsequent comparison. In this aspect, the delta image is integrated for each subsequent comparison An aspect of the invention may be a system with a processor and a memory coupled to the processor. The memory has stored on it executable instructions that are executed by the processor cause it to effectuate operations in which a plurality of differences in intensity is determined between each pixel of a plurality of pixels of an image and each corresponding pixel of a subsequent image. In this aspect, the pixel intensity is the intensity of the infrared color channel. In this aspect, a "delta" image is generated of the differences in pixel intensity. A visual contrast of the delta image is enhanced to accentuate a characteristic associated with it, and it is visually rendered, as well as each subsequent delta image generated by each subsequent comparison. In this aspect, the delta image is integrated for each subsequent comparison An aspect of the invention may be a system with a processor and a memory coupled to the processor. The memory has stored on it executable instructions that are executed by the processor cause it to effectuate operations in which a plurality of differences in intensity is determined between each pixel of a plurality of pixels of an image of a human face and each corresponding pixel of a subsequent image of the human face. In this aspect, a "delta" image is generated of the differences in pixel intensity. A visual contrast of the delta image is enhanced to accentuate a characteristic associated with it, and it is visually rendered, as well as each subsequent delta image generated by each subsequent comparison.

An aspect of the invention may be a system with a processor and a memory coupled to the processor. The memory has stored on it executable instructions that are executed by the processor cause it to effectuate operations in which a plurality of differences in intensity is determined between each pixel of a plurality of pixels of an image of a human face and each corresponding pixel of a subsequent image of the human face. In this aspect, a "delta" image is generated of the differences in pixel intensity. A visual contrast of the delta image is enhanced to accentuate a characteristic associated with it, and it is visually rendered, as well as each subsequent delta image generated by each subsequent comparison.

An aspect of the invention may be a system with a processor and a memory coupled to the processor. The memory has stored on it executable instructions that are executed by the processor cause it to effectuate operations in which a plurality of differences in intensity is determined between each pixel of a plurality of pixels of an image of a human face and each corresponding pixel of a subsequent image of the human face. In this aspect, the pixel intensity is the intensity of a specific color channel. In this aspect, a "delta" image is generated of the differences in pixel intensity. A visual contrast of the delta image is enhanced to accentuate a characteristic associated with it, and it is visually rendered, as well as each subsequent delta image generated by each subsequent comparison.

An aspect of the invention may be a system with a processor and a memory coupled to the processor. The memory has stored on it executable instructions that are executed by the processor cause it to effectuate operations in which a plurality of differences in intensity is determined between each pixel of a plurality of pixels of an image of a human face and each corresponding pixel of a subsequent image of the human face. In this aspect, the pixel intensity is the intensity of the infrared color channel. In this aspect, a "delta" image is generated of the differences in pixel intensity. A visual contrast of the delta image is enhanced to accentuate a characteristic associated with it, and it is visually rendered, as well as each subsequent delta image generated by each subsequent comparison.

An aspect of the invention may be a system with a processor and a memory coupled to the processor. The memory has stored on it executable instructions that are executed by the processor cause it to effectuate operations in which a plurality of differences in intensity is determined between each pixel of a plurality of pixels of an image of a human face and each corresponding pixel of a subsequent image of a human face. The images in this aspect are captured by a capture device. In this aspect, a "delta" image is generated of the differences in pixel intensity. A visual contrast of the delta image is enhanced to accentuate a characteristic associated with it, and it is visually rendered, as well as each subsequent delta image generated by each subsequent comparison.

An aspect of the invention may be a system with a processor and a memory coupled to the processor. The memory has stored on it executable instructions that are executed by the processor cause it to effectuate operations in which a plurality of differences in intensity is determined between each pixel of a plurality of pixels of an image of a human face and each corresponding pixel of a subsequent image of the human face. In this aspect, the pixel intensity is the intensity of a specific color channel. In this aspect, a "delta" image is generated of the differences in pixel intensity. A visual contrast of the delta image is enhanced to accentuate a characteristic associated with it, and it is visually rendered, as well as each subsequent delta image generated by each subsequent comparison. In this aspect, the delta image is integrated for each subsequent comparison An aspect of the invention may be a system with a processor and a memory coupled to the processor. The memory has stored on it executable instructions that are executed by the processor cause it to effectuate operations in which a plurality of differences in intensity is determined between each pixel of a plurality of pixels of an image of a human face and each corresponding pixel of a subsequent image of the human face. In this aspect, the pixel intensity is the intensity of the infrared color channel. In this aspect, a "delta" image is generated of the differences in pixel intensity. A visual contrast of the delta image is enhanced to accentuate a characteristic associated with it, and it is visually rendered, as well as each subsequent delta image generated by each subsequent comparison. In this aspect, the delta image is integrated for each subsequent comparison An aspect of the invention may be a system with a processor and a memory coupled to the processor. The memory has stored on it executable instructions that are executed by the processor cause it to effectuate operations in which a plurality of differences in intensity is determined between each pixel of a plurality of pixels of an image of a human face and each corresponding pixel of a subsequent image of the human face. In this aspect, a "delta" image is generated of the differences in pixel intensity. A visual contrast of the delta image is enhanced to accentuate a characteristic associated with it, and it is visually rendered, as well as each subsequent delta image generated by each subsequent comparison. In this aspect, the delta image is integrated for each subsequent comparison An aspect of the invention may be a system with a processor and a memory coupled to the processor. The memory has stored on it executable instructions that are executed by the processor cause it to effectuate operations in which a plurality of differences in intensity is determined between each pixel of a plurality of pixels of an image of a human face and each corresponding pixel of a subsequent image of the human face. In this aspect, the pixel intensity is the intensity of a specific color channel. In this aspect, a "delta" image is generated of the differences in pixel intensity. A visual contrast of the delta image is enhanced to accentuate a characteristic associated with it, and it is visually rendered, as well as each subsequent delta image generated by each subsequent comparison.

An aspect of the invention may be a system with a processor and a memory coupled to the processor. The memory has stored on it executable instructions that are executed by the processor cause it to effectuate operations in which a plurality of differences in intensity is determined between each pixel of a plurality of pixels of an image of a human face and each corresponding pixel of a subsequent image of the human face. In this aspect, the pixel intensity is the intensity of the infrared color channel. In this aspect, a "delta" image is generated of the differences in pixel intensity. A visual contrast of the delta image is enhanced to accentuate a characteristic associated with it, and it is visually rendered, as well as each subsequent delta image generated by each subsequent comparison.

An aspect of the invention may be a system with a processor and a memory coupled to the processor. The memory has stored on it executable instructions that are executed by the processor cause it to effectuate operations in which a plurality of differences in intensity is determined between each pixel of a plurality of pixels of an image of a human face and each corresponding pixel of a subsequent image of the human face. In this aspect, the pixel intensity is the intensity of a specific color channel. In this aspect, a "delta" image is generated of the differences in pixel intensity. A visual contrast of the delta image is enhanced to accentuate a characteristic associated with it, and it is visually rendered, as well as each subsequent delta image generated by each subsequent comparison. In this aspect, the delta image is integrated for each subsequent comparison An aspect of the invention may be a system with a processor and a memory coupled to the processor. The memory has stored on it executable instructions that are executed by the processor cause it to effectuate operations in which a plurality of differences in intensity is determined between each pixel of a plurality of pixels of an image of a human face and each corresponding pixel of a subsequent image of the human face. In this aspect, the pixel intensity is the intensity of the infrared color channel. In this aspect, a "delta" image is generated of the differences in pixel intensity. A visual contrast of the delta image is enhanced to accentuate a characteristic associated with it, and it is visually rendered, as well as each subsequent delta image generated by each subsequent comparison.

An aspect of the invention may be a system with a processor and a memory coupled to the processor. The memory has stored on it executable instructions that are executed by the processor cause it to effectuate operations in which a plurality of differences in intensity is determined between each pixel of a plurality of pixels of an image of a human face and each corresponding pixel of a subsequent image of the human face. In this aspect, the pixel intensity is the intensity of a specific color channel. In this aspect, a "delta" image is generated of the differences in pixel intensity. A visual contrast of the delta image is enhanced to accentuate a characteristic associated with it, and it is visually rendered, as well as each subsequent delta image generated by each subsequent comparison. In this aspect, the delta image is integrated for each subsequent comparison An aspect of the invention may be a system with a processor and a memory coupled to the processor. The memory has stored on it executable instructions that are executed by the processor cause it to effectuate operations in which a plurality of differences in intensity is determined between each pixel of a plurality of pixels of an image of a human face and each corresponding pixel of a subsequent image of the human face. In this aspect, the pixel intensity is the intensity of the infrared color channel. In this aspect, a "delta" image is generated of the differences in pixel intensity. A visual contrast of the delta image is enhanced to accentuate a characteristic associated with it, and it is visually rendered, as well as each subsequent delta image generated by each subsequent comparison.

An aspect of the invention may be a system with a processor and a memory coupled to the processor. The memory has stored on it executable instructions that are executed by the processor cause it to effectuate operations in which a plurality of differences in intensity is determined between each pixel of a plurality of pixels of an image of a human face and each corresponding pixel of a subsequent image of the human face. In this aspect, a "delta" image is generated of the differences in pixel intensity, representing a blood flow in the human face. A visual contrast of the delta image is enhanced to accentuate a characteristic associated with it, and it is visually rendered, as well as each subsequent delta image generated by each subsequent comparison.

An aspect of the invention may be a system with a processor and a memory coupled to the processor. The memory has stored on it executable instructions that are executed by the processor cause it to effectuate operations in which a plurality of differences in intensity is determined between each pixel of a plurality of pixels of an image of a human face and each corresponding pixel of a subsequent image of the human face. In this aspect, a "delta" image is generated of the differences in pixel intensity, representing a blood flow in the human face. A visual contrast of the delta image is enhanced to accentuate a characteristic associated with it, and it is visually rendered, as well as each subsequent delta image generated by each subsequent comparison.

An aspect of the invention may be a system with a processor and a memory coupled to the processor. The memory has stored on it executable instructions that are executed by the processor cause it to effectuate operations in which a plurality of differences in intensity is determined between each pixel of a plurality of pixels of an image of a human face and each corresponding pixel of a subsequent image of the human face. In this aspect, the pixel intensity is the intensity of a specific color channel. In this aspect, a "delta" image is generated of the differences in pixel intensity, representing a blood flow in the human face. A visual contrast of the delta image is enhanced to accentuate a characteristic associated with it, and it is visually rendered, as well as each subsequent delta image generated by each subsequent comparison.

An aspect of the invention may be a system with a processor and a memory coupled to the processor. The memory has stored on it executable instructions that are executed by the processor cause it to effectuate operations in which a plurality of differences in intensity is determined between each pixel of a plurality of pixels of an image of a human face and each corresponding pixel of a subsequent image of the human face. In this aspect, the pixel intensity is the intensity of the infrared color channel. In this aspect, a "delta" image is generated of the differences in pixel intensity, representing a blood flow in the human face. A visual contrast of the delta image is enhanced to accentuate a characteristic associated with it, and it is visually rendered, as well as each subsequent delta image generated by each subsequent comparison.

An aspect of the invention may be a system with a processor and a memory coupled to the processor. The memory has stored on it executable instructions that are executed by the processor cause it to effectuate operations in which a plurality of differences in intensity is determined between each pixel of a plurality of pixels of an image of a human face and each corresponding pixel of a subsequent image of a human face. The images in this aspect are captured by a capture device. In this aspect, a "delta" image is generated of the differences in pixel intensity, representing a blood flow in the human face. A visual contrast of the delta image is enhanced to accentuate a characteristic associated with it, and it is visually rendered, as well as each subsequent delta image generated by each subsequent comparison.

An aspect of the invention may be a system with a processor and a memory coupled to the processor. The memory has stored on it executable instructions that are executed by the processor cause it to effectuate operations in which a plurality of differences in intensity is determined between each pixel of a plurality of pixels of an image of a human face and each corresponding pixel of a subsequent image of the human face. In this aspect, the pixel intensity is the intensity of a specific color channel. In this aspect, a "delta" image is generated of the differences in pixel intensity, representing a blood flow in the human face. A visual contrast of the delta image is enhanced to accentuate a characteristic associated with it, and it is visually rendered, as well as each subsequent delta image generated by each subsequent comparison. In this aspect, the delta image is integrated for each subsequent comparison An aspect of the invention may be a system with a processor and a memory coupled to the processor. The memory has stored on it executable instructions that are executed by the processor cause it to effectuate operations in which a plurality of differences in intensity is determined between each pixel of a plurality of pixels of an image of a human face and each corresponding pixel of a subsequent image of the human face. In this aspect, the pixel intensity is the intensity of the infrared color channel. In this aspect, a "delta" image is generated of the differences in pixel intensity, representing a blood flow in the human face. A visual contrast of the delta image is enhanced to accentuate a characteristic associated with it, and it is visually rendered, as well as each subsequent delta image generated by each subsequent comparison. In this aspect, the delta image is integrated for each subsequent comparison An aspect of the invention may be a system with a processor and a memory coupled to the processor. The memory has stored on it executable instructions that are executed by the processor cause it to effectuate operations in which a plurality of differences in intensity is determined between each pixel of a plurality of pixels of an image of a human face and each corresponding pixel of a subsequent image of the human face. In this aspect, a "delta" image is generated of the differences in pixel intensity, representing a blood flow in the human face. A visual contrast of the delta image is enhanced to accentuate a characteristic associated with it, and it is visually rendered, as well as each subsequent delta image generated by each subsequent comparison. In this aspect, the delta image is integrated for each subsequent comparison An aspect of the invention may be a system with a processor and a memory coupled to the processor. The memory has stored on it executable instructions that are executed by the processor cause it to effectuate operations in which a plurality of differences in intensity is determined between each pixel of a plurality of pixels of an image of a human face and each corresponding pixel of a subsequent image of the human face. In this aspect, the pixel intensity is the intensity of a specific color channel. In this aspect, a "delta" image is generated of the differences in pixel intensity, representing a blood flow in the human face. A visual contrast of the delta image is enhanced to accentuate a characteristic associated with it, and it is visually rendered, as well as each subsequent delta image generated by each subsequent comparison.

An aspect of the invention may be a system with a processor and a memory coupled to the processor. The memory has stored on it executable instructions that are executed by the processor cause it to effectuate operations in which a plurality of differences in intensity is determined between each pixel of a plurality of pixels of an image of a human face and each corresponding pixel of a subsequent image of the human face. In this aspect, the pixel intensity is the intensity of the infrared color channel. In this aspect, a "delta" image is generated of the differences in pixel intensity, representing a blood flow in the human face. A visual contrast of the delta image is enhanced to accentuate a characteristic associated with it, and it is visually rendered, as well as each subsequent delta image generated by each subsequent comparison.

An aspect of the invention may be a system with a processor and a memory coupled to the processor. The memory has stored on it executable instructions that are executed by the processor cause it to effectuate operations in which a plurality of differences in intensity is determined between each pixel of a plurality of pixels of an image of a human face and each corresponding pixel of a subsequent image of the human face. In this aspect, the pixel intensity is the intensity of a specific color channel. In this aspect, a "delta" image is generated of the differences in pixel intensity, representing a blood flow in the human face. A visual contrast of the delta image is enhanced to accentuate a characteristic associated with it, and it is visually rendered, as well as each subsequent delta image generated by each subsequent comparison. In this aspect, the delta image is integrated for each subsequent comparison An aspect of the invention may be a system with a processor and a memory coupled to the processor. The memory has stored on it executable instructions that are executed by the processor cause it to effectuate operations in which a plurality of differences in intensity is determined between each pixel of a plurality of pixels of an image of a human face and each corresponding pixel of a subsequent image of the human face. In this aspect, the pixel intensity is the intensity of the infrared color channel. In this aspect, a "delta" image is generated of the differences in pixel intensity, representing a blood flow in the human face. A visual contrast of the delta image is enhanced to accentuate a characteristic associated with it, and it is visually rendered, as well as each subsequent delta image generated by each subsequent comparison.

An aspect of the invention may be a computer readable storage medium with executable instructions that when executed by a processor cause the processor to effectuate operations in which a plurality of differences in intensity is determined between each pixel of a plurality of pixels of an image and each corresponding pixel of a subsequent image. In this aspect, a "delta" image is generated of the differences in pixel intensity. A visual contrast of the delta image is enhanced to accentuate a characteristic associated with it, and it is visually rendered, as well as each subsequent delta image generated by each subsequent comparison.

An aspect of the invention may be a computer readable storage medium with executable instructions that when executed by a processor cause the processor to effectuate operations in which a plurality of differences in intensity is determined between each pixel of a plurality of pixels of an image and each corresponding pixel of a subsequent image. In this aspect, a "delta" image is generated of the differences in pixel intensity. A visual contrast of the delta image is enhanced to accentuate a characteristic associated with it, and it is visually rendered, as well as each subsequent delta image generated by each subsequent comparison. In this aspect, the delta image is integrated for each subsequent comparison An aspect of the invention may be a computer readable storage medium with executable instructions that when executed by a processor cause the processor to effectuate operations in which a plurality of differences in intensity is determined between each pixel of a plurality of pixels of an image and each corresponding pixel of a subsequent image. In this aspect, the pixel intensity is the intensity of a specific color channel. In this aspect, a "delta" image is generated of the differences in pixel intensity. A visual contrast of the delta image is enhanced to accentuate a characteristic associated with it, and it is visually rendered, as well as each subsequent delta image generated by each subsequent comparison.

An aspect of the invention may be a computer readable storage medium with executable instructions that when executed by a processor cause the processor to effectuate operations in which a plurality of differences in intensity is determined between each pixel of a plurality of pixels of an image and each corresponding pixel of a subsequent image. In this aspect, the pixel intensity is the intensity of a specific color channel. In this aspect, a "delta" image is generated of the differences in pixel intensity. A visual contrast of the delta image is enhanced to accentuate a characteristic associated with it, and it is visually rendered, as well as each subsequent delta image generated by each subsequent comparison. In this aspect, the delta image is integrated for each subsequent comparison An aspect of the invention may be a computer readable storage medium with executable instructions that when executed by a processor cause the processor to effectuate operations in which a plurality of differences in intensity is determined between each pixel of a plurality of pixels of an image and each corresponding pixel of a subsequent image. In this aspect, the pixel intensity is the intensity of the infrared color channel. In this aspect, a "delta" image is generated of the differences in pixel intensity. A visual contrast of the delta image is enhanced to accentuate a characteristic associated with it, and it is visually rendered, as well as each subsequent delta image generated by each subsequent comparison.

An aspect of the invention may be a computer readable storage medium with executable instructions that when executed by a processor cause the processor to effectuate operations in which a plurality of differences in intensity is determined between each pixel of a plurality of pixels of an image and each corresponding pixel of a subsequent image. In this aspect, the pixel intensity is the intensity of the infrared color channel. In this aspect, a "delta" image is generated of the differences in pixel intensity. A visual contrast of the delta image is enhanced to accentuate a characteristic associated with it, and it is visually rendered, as well as each subsequent delta image generated by each subsequent comparison. In this aspect, the delta image is integrated for each subsequent comparison An aspect of the invention may be a computer readable storage medium with executable instructions that when executed by a processor cause the processor to effectuate operations in which a plurality of differences in intensity is determined between each pixel of a plurality of pixels of an image and each corresponding pixel of a subsequent image. The images in this aspect are captured by a capture device. In this aspect, a "delta" image is generated of the differences in pixel intensity. A visual contrast of the delta image is enhanced to accentuate a characteristic associated with it, and it is visually rendered, as well as each subsequent delta image generated by each subsequent comparison.

An aspect of the invention may be a computer readable storage medium with executable instructions that when executed by a processor cause the processor to effectuate operations in which a plurality of differences in intensity is determined between each pixel of a plurality of pixels of an image and each corresponding pixel of a subsequent image. In this aspect, a "delta" image is generated of the differences in pixel intensity. A visual contrast of the delta image is enhanced to accentuate a characteristic associated with it, and it is visually rendered, as well as each subsequent delta image generated by each subsequent comparison. In this aspect, the delta image is integrated for each subsequent comparison An aspect of the invention may be a computer readable storage medium with executable instructions that when executed by a processor cause the processor to effectuate operations in which a plurality of differences in intensity is determined between each pixel of a plurality of pixels of an image and each corresponding pixel of a subsequent image. In this aspect, the pixel intensity is the intensity of a specific color channel. In this aspect, a "delta" image is generated of the differences in pixel intensity. A visual contrast of the delta image is enhanced to accentuate a characteristic associated with it, and it is visually rendered, as well as each subsequent delta image generated by each subsequent comparison.

An aspect of the invention may be a computer readable storage medium with executable instructions that when executed by a processor cause the processor to effectuate operations in which a plurality of differences in intensity is determined between each pixel of a plurality of pixels of an image and each corresponding pixel of a subsequent image. In this aspect, the pixel intensity is the intensity of the infrared color channel. In this aspect, a "delta" image is generated of the differences in pixel intensity. A visual contrast of the delta image is enhanced to accentuate a characteristic associated with it, and it is visually rendered, as well as each subsequent delta image generated by each subsequent comparison.

An aspect of the invention may be a computer readable storage medium with executable instructions that when executed by a processor cause the processor to effectuate operations in which a plurality of differences in intensity is determined between each pixel of a plurality of pixels of an image and each corresponding pixel of a subsequent image. In this aspect, the pixel intensity is the intensity of a specific color channel. In this aspect, a "delta" image is generated of the differences in pixel intensity. A visual contrast of the delta image is enhanced to accentuate a characteristic associated with it, and it is visually rendered, as well as each subsequent delta image generated by each subsequent comparison. In this aspect, the delta image is integrated for each subsequent comparison An aspect of the invention may be a computer readable storage medium with executable instructions that when executed by a processor cause the processor to effectuate operations in which a plurality of differences in intensity is determined between each pixel of a plurality of pixels of an image and each corresponding pixel of a subsequent image. In this aspect, the pixel intensity is the intensity of the infrared color channel. In this aspect, a "delta" image is generated of the differences in pixel intensity. A visual contrast of the delta image is enhanced to accentuate a characteristic associated with it, and it is visually rendered, as well as each subsequent delta image generated by each subsequent comparison. In this aspect, the delta image is integrated for each subsequent comparison An aspect of the invention may be a computer readable storage medium with executable instructions that when executed by a processor cause the processor to effectuate operations in which a plurality of differences in intensity is determined between each pixel of a plurality of pixels of an image of a human face and each corresponding pixel of a subsequent image of the human face. In this aspect, a "delta" image is generated of the differences in pixel intensity. A visual contrast of the delta image is enhanced to accentuate a characteristic associated with it, and it is visually rendered, as well as each subsequent delta image generated by each subsequent comparison.

An aspect of the invention may be a computer readable storage medium with executable instructions that when executed by a processor cause the processor to effectuate operations in which a plurality of differences in intensity is determined between each pixel of a plurality of pixels of an image of a human face and each corresponding pixel of a subsequent image of the human face. In this aspect, a "delta" image is generated of the differences in pixel intensity. A visual contrast of the delta image is enhanced to accentuate a characteristic associated with it, and it is visually rendered, as well as each subsequent delta image generated by each subsequent comparison.

An aspect of the invention may be a computer readable storage medium with executable instructions that when executed by a processor cause the processor to effectuate operations in which a plurality of differences in intensity is determined between each pixel of a plurality of pixels of an image of a human face and each corresponding pixel of a subsequent image of the human face. In this aspect, the pixel intensity is the intensity of a specific color channel. In this aspect, a "delta" image is generated of the differences in pixel intensity. A visual contrast of the delta image is enhanced to accentuate a characteristic associated with it, and it is visually rendered, as well as each subsequent delta image generated by each subsequent comparison.

An aspect of the invention may be a computer readable storage medium with executable instructions that when executed by a processor cause the processor to effectuate operations in which a plurality of differences in intensity is determined between each pixel of a plurality of pixels of an image of a human face and each corresponding pixel of a subsequent image of the human face. In this aspect, the pixel intensity is the intensity of the infrared color channel. In this aspect, a "delta" image is generated of the differences in pixel intensity. A visual contrast of the delta image is enhanced to accentuate a characteristic associated with it, and it is visually rendered, as well as each subsequent delta image generated by each subsequent comparison.

An aspect of the invention may be a computer readable storage medium with executable instructions that when executed by a processor cause the processor to effectuate operations in which a plurality of differences in intensity is determined between each pixel of a plurality of pixels of an image of a human face and each corresponding pixel of a subsequent image of a human face. The images in this aspect are captured by a capture device. In this aspect, a "delta" image is generated of the differences in pixel intensity. A visual contrast of the delta image is enhanced to accentuate a characteristic associated with it, and it is visually rendered, as well as each subsequent delta image generated by each subsequent comparison.

An aspect of the invention may be a computer readable storage medium with executable instructions that when executed by a processor cause the processor to effectuate operations in which a plurality of differences in intensity is determined between each pixel of a plurality of pixels of an image of a human face and each corresponding pixel of a subsequent image of the human face. In this aspect, the pixel intensity is the intensity of a specific color channel. In this aspect, a "delta" image is generated of the differences in pixel intensity. A visual contrast of the delta image is enhanced to accentuate a characteristic associated with it, and it is visually rendered, as well as each subsequent delta image generated by each subsequent comparison. In this aspect, the delta image is integrated for each subsequent comparison An aspect of the invention may be a computer readable storage medium with executable instructions that when executed by a processor cause the processor to effectuate operations in which a plurality of differences in intensity is determined between each pixel of a plurality of pixels of an image of a human face and each corresponding pixel of a subsequent image of the human face. In this aspect, the pixel intensity is the intensity of the infrared color channel. In this aspect, a "delta" image is generated of the differences in pixel intensity. A visual contrast of the delta image is enhanced to accentuate a characteristic associated with it, and it is visually rendered, as well as each subsequent delta image generated by each subsequent comparison. In this aspect, the delta image is integrated for each subsequent comparison An aspect of the invention may be a computer readable storage medium with executable instructions that when executed by a processor cause the processor to effectuate operations in which a plurality of differences in intensity is determined between each pixel of a plurality of pixels of an image of a human face and each corresponding pixel of a subsequent image of the human face. In this aspect, a "delta" image is generated of the differences in pixel intensity. A visual contrast of the delta image is enhanced to accentuate a characteristic associated with it, and it is visually rendered, as well as each subsequent delta image generated by each subsequent comparison. In this aspect, the delta image is integrated for each subsequent comparison An aspect of the invention may be a computer readable storage medium with executable instructions that when executed by a processor cause the processor to effectuate operations in which a plurality of differences in intensity is determined between each pixel of a plurality of pixels of an image of a human face and each corresponding pixel of a subsequent image of the human face. In this aspect, the pixel intensity is the intensity of a specific color channel. In this aspect, a "delta" image is generated of the differences in pixel intensity. A visual contrast of the delta image is enhanced to accentuate a characteristic associated with it, and it is visually rendered, as well as each subsequent delta image generated by each subsequent comparison.

An aspect of the invention may be a computer readable storage medium with executable instructions that when executed by a processor cause the processor to effectuate operations in which a plurality of differences in intensity is determined between each pixel of a plurality of pixels of an image of a human face and each corresponding pixel of a subsequent image of the human face. In this aspect, the pixel intensity is the intensity of the infrared color channel. In this aspect, a "delta" image is generated of the differences in pixel intensity. A visual contrast of the delta image is enhanced to accentuate a characteristic associated with it, and it is visually rendered, as well as each subsequent delta image generated by each subsequent comparison.

An aspect of the invention may be a computer readable storage medium with executable instructions that when executed by a processor cause the processor to effectuate operations in which a plurality of differences in intensity is determined between each pixel of a plurality of pixels of an image of a human face and each corresponding pixel of a subsequent image of the human face. In this aspect, the pixel intensity is the intensity of a specific color channel. In this aspect, a "delta" image is generated of the differences in pixel intensity. A visual contrast of the delta image is enhanced to accentuate a characteristic associated with it, and it is visually rendered, as well as each subsequent delta image generated by each subsequent comparison. In this aspect, the delta image is integrated for each subsequent comparison An aspect of the invention may be a computer readable storage medium with executable instructions that when executed by a processor cause the processor to effectuate operations in which a plurality of differences in intensity is determined between each pixel of a plurality of pixels of an image of a human face and each corresponding pixel of a subsequent image of the human face. In this aspect, the pixel intensity is the intensity of the infrared color channel. In this aspect, a "delta" image is generated of the differences in pixel intensity. A visual contrast of the delta image is enhanced to accentuate a characteristic associated with it, and it is visually rendered, as well as each subsequent delta image generated by each subsequent comparison.

An aspect of the invention may be a computer readable storage medium with executable instructions that when executed by a processor cause the processor to effectuate operations in which a plurality of differences in intensity is determined between each pixel of a plurality of pixels of an image of a human face and each corresponding pixel of a subsequent image of the human face. In this aspect, the pixel intensity is the intensity of a specific color channel. In this aspect, a "delta" image is generated of the differences in pixel intensity. A visual contrast of the delta image is enhanced to accentuate a characteristic associated with it, and it is visually rendered, as well as each subsequent delta image generated by each subsequent comparison. In this aspect, the delta image is integrated for each subsequent comparison An aspect of the invention may be a computer readable storage medium with executable instructions that when executed by a processor cause the processor to effectuate operations in which a plurality of differences in intensity is determined between each pixel of a plurality of pixels of an image of a human face and each corresponding pixel of a subsequent image of the human face. In this aspect, the pixel intensity is the intensity of the infrared color channel. In this aspect, a "delta" image is generated of the differences in pixel intensity. A visual contrast of the delta image is enhanced to accentuate a characteristic associated with it, and it is visually rendered, as well as each subsequent delta image generated by each subsequent comparison.

An aspect of the invention may be a computer readable storage medium with executable instructions that when executed by a processor cause the processor to effectuate operations in which a plurality of differences in intensity is determined between each pixel of a plurality of pixels of an image of a human face and each corresponding pixel of a subsequent image of the human face. In this aspect, a "delta" image is generated of the differences in pixel intensity, representing a blood flow in the human face. A visual contrast of the delta image is enhanced to accentuate a characteristic associated with it, and it is visually rendered, as well as each subsequent delta image generated by each subsequent comparison.

An aspect of the invention may be a computer readable storage medium with executable instructions that when executed by a processor cause the processor to effectuate operations in which a plurality of differences in intensity is determined between each pixel of a plurality of pixels of an image of a human face and each corresponding pixel of a subsequent image of the human face. In this aspect, a "delta" image is generated of the differences in pixel intensity, representing a blood flow in the human face. A visual contrast of the delta image is enhanced to accentuate a characteristic associated with it, and it is visually rendered, as well as each subsequent delta image generated by each subsequent comparison.

An aspect of the invention may be a computer readable storage medium with executable instructions that when executed by a processor cause the processor to effectuate operations in which a plurality of differences in intensity is determined between each pixel of a plurality of pixels of an image of a human face and each corresponding pixel of a subsequent image of the human face. In this aspect, the pixel intensity is the intensity of a specific color channel. In this aspect, a "delta" image is generated of the differences in pixel intensity, representing a blood flow in the human face. A visual contrast of the delta image is enhanced to accentuate a characteristic associated with it, and it is visually rendered, as well as each subsequent delta image generated by each subsequent comparison.

An aspect of the invention may be a computer readable storage medium with executable instructions that when executed by a processor cause the processor to effectuate operations in which a plurality of differences in intensity is determined between each pixel of a plurality of pixels of an image of a human face and each corresponding pixel of a subsequent image of the human face. In this aspect, the pixel intensity is the intensity of the infrared color channel. In this aspect, a "delta" image is generated of the differences in pixel intensity, representing a blood flow in the human face. A visual contrast of the delta image is enhanced to accentuate a characteristic associated with it, and it is visually rendered, as well as each subsequent delta image generated by each subsequent comparison.

An aspect of the invention may be a computer readable storage medium with executable instructions that when executed by a processor cause the processor to effectuate operations in which a plurality of differences in intensity is determined between each pixel of a plurality of pixels of an image of a human face and each corresponding pixel of a subsequent image of a human face. The images in this aspect are captured by a capture device. In this aspect, a "delta" image is generated of the differences in pixel intensity, representing a blood flow in the human face. A visual contrast of the delta image is enhanced to accentuate a characteristic associated with it, and it is visually rendered, as well as each subsequent delta image generated by each subsequent comparison.

An aspect of the invention may be a computer readable storage medium with executable instructions that when executed by a processor cause the processor to effectuate operations in which a plurality of differences in intensity is determined between each pixel of a plurality of pixels of an image of a human face and each corresponding pixel of a subsequent image of the human face. In this aspect, the pixel intensity is the intensity of a specific color channel. In this aspect, a "delta" image is generated of the differences in pixel intensity, representing a blood flow in the human face. A visual contrast of the delta image is enhanced to accentuate a characteristic associated with it, and it is visually rendered, as well as each subsequent delta image generated by each subsequent comparison. In this aspect, the delta image is integrated for each subsequent comparison An aspect of the invention may be a computer readable storage medium with executable instructions that when executed by a processor cause the processor to effectuate operations in which a plurality of differences in intensity is determined between each pixel of a plurality of pixels of an image of a human face and each corresponding pixel of a subsequent image of the human face. In this aspect, the pixel intensity is the intensity of the infrared color channel. In this aspect, a "delta" image is generated of the differences in pixel intensity, representing a blood flow in the human face. A visual contrast of the delta image is enhanced to accentuate a characteristic associated with it, and it is visually rendered, as well as each subsequent delta image generated by each subsequent comparison. In this aspect, the delta image is integrated for each subsequent comparison An aspect of the invention may be a computer readable storage medium with executable instructions that when executed by a processor cause the processor to effectuate operations in which a plurality of differences in intensity is determined between each pixel of a plurality of pixels of an image of a human face and each corresponding pixel of a subsequent image of the human face. In this aspect, a "delta" image is generated of the differences in pixel intensity, representing a blood flow in the human face. A visual contrast of the delta image is enhanced to accentuate a characteristic associated with it, and it is visually rendered, as well as each subsequent delta image generated by each subsequent comparison. In this aspect, the delta image is integrated for each subsequent comparison An aspect of the invention may be a computer readable storage medium with executable instructions that when executed by a processor cause the processor to effectuate operations in which a plurality of differences in intensity is determined between each pixel of a plurality of pixels of an image of a human face and each corresponding pixel of a subsequent image of the human face. In this aspect, the pixel intensity is the intensity of a specific color channel. In this aspect, a "delta" image is generated of the differences in pixel intensity, representing a blood flow in the human face. A visual contrast of the delta image is enhanced to accentuate a characteristic associated with it, and it is visually rendered, as well as each subsequent delta image generated by each subsequent comparison.

An aspect of the invention may be a computer readable storage medium with executable instructions that when executed by a processor cause the processor to effectuate operations in which a plurality of differences in intensity is determined between each pixel of a plurality of pixels of an image of a human face and each corresponding pixel of a subsequent image of the human face. In this aspect, the pixel intensity is the intensity of the infrared color channel. In this aspect, a "delta" image is generated of the differences in pixel intensity, representing a blood flow in the human face. A visual contrast of the delta image is enhanced to accentuate a characteristic associated with it, and it is visually rendered, as well as each subsequent delta image generated by each subsequent comparison.

An aspect of the invention may be a computer readable storage medium with executable instructions that when executed by a processor cause the processor to effectuate operations in which a plurality of differences in intensity is determined between each pixel of a plurality of pixels of an image of a human face and each corresponding pixel of a subsequent image of the human face. In this aspect, the pixel intensity is the intensity of a specific color channel. In this aspect, a "delta" image is generated of the differences in pixel intensity, representing a blood flow in the human face. A visual contrast of the delta image is enhanced to accentuate a characteristic associated with it, and it is visually rendered, as well as each subsequent delta image generated by each subsequent comparison. In this aspect, the delta image is integrated for each subsequent comparison An aspect of the invention may be a computer readable storage medium with executable instructions that when executed by a processor cause the processor to effectuate operations in which a plurality of differences in intensity is determined between each pixel of a plurality of pixels of an image of a human face and each corresponding pixel of a subsequent image of the human face. In this aspect, the pixel intensity is the intensity of the infrared color channel. In this aspect, a "delta" image is generated of the differences in pixel intensity, representing a blood flow in the human face. A visual contrast of the delta image is enhanced to accentuate a characteristic associated with it, and it is visually rendered, as well as each subsequent delta image generated by each subsequent comparison.

An aspect of the invention may be a computer-implemented system with means for determining a plurality of differences in intensity between each pixel of a plurality of pixels of an image and each corresponding pixel of a subsequent image. In this aspect, a "delta" image is generated of the differences in pixel intensity. A visual contrast of the delta image is enhanced to accentuate a characteristic associated with it, and it is visually rendered, as well as each subsequent delta image generated by each subsequent comparison.

An aspect of the invention may be a computer-implemented system with means for determining a plurality of differences in intensity between each pixel of a plurality of pixels of an image and each corresponding pixel of a subsequent image. In this aspect, a "delta" image is generated of the differences in pixel intensity. A visual contrast of the delta image is enhanced to accentuate a characteristic associated with it, and it is visually rendered, as well as each subsequent delta image generated by each subsequent comparison. In this aspect, the delta image is integrated for each subsequent comparison An aspect of the invention may be a computer-implemented system with means for determining a plurality of differences in intensity between each pixel of a plurality of pixels of an image and each corresponding pixel of a subsequent image. In this aspect, the pixel intensity is the intensity of a specific color channel. In this aspect, a "delta" image is generated of the differences in pixel intensity. A visual contrast of the delta image is enhanced to accentuate a characteristic associated with it, and it is visually rendered, as well as each subsequent delta image generated by each subsequent comparison.

An aspect of the invention may be a computer-implemented system with means for determining a plurality of differences in intensity between each pixel of a plurality of pixels of an image and each corresponding pixel of a subsequent image. In this aspect, the pixel intensity is the intensity of a specific color channel. In this aspect, a "delta" image is generated of the differences in pixel intensity. A visual contrast of the delta image is enhanced to accentuate a characteristic associated with it, and it is visually rendered, as well as each subsequent delta image generated by each subsequent comparison. In this aspect, the delta image is integrated for each subsequent comparison An aspect of the invention may be a computer-implemented system with means for determining a plurality of differences in intensity between each pixel of a plurality of pixels of an image and each corresponding pixel of a subsequent image. In this aspect, the pixel intensity is the intensity of the infrared color channel. In this aspect, a "delta" image is generated of the differences in pixel intensity. A visual contrast of the delta image is enhanced to accentuate a characteristic associated with it, and it is visually rendered, as well as each subsequent delta image generated by each subsequent comparison.

An aspect of the invention may be a computer-implemented system with means for determining a plurality of differences in intensity between each pixel of a plurality of pixels of an image and each corresponding pixel of a subsequent image. In this aspect, the pixel intensity is the intensity of the infrared color channel. In this aspect, a "delta" image is generated of the differences in pixel intensity. A visual contrast of the delta image is enhanced to accentuate a characteristic associated with it, and it is visually rendered, as well as each subsequent delta image generated by each subsequent comparison. In this aspect, the delta image is integrated for each subsequent comparison An aspect of the invention may be a computer-implemented system with means for determining a plurality of differences in intensity between each pixel of a plurality of pixels of an image and each corresponding pixel of a subsequent image. The images in this aspect are captured by a capture device. In this aspect, a "delta" image is generated of the differences in pixel intensity. A visual contrast of the delta image is enhanced to accentuate a characteristic associated with it, and it is visually rendered, as well as each subsequent delta image generated by each subsequent comparison.

An aspect of the invention may be a computer-implemented system with means for determining a plurality of differences in intensity between each pixel of a plurality of pixels of an image and each corresponding pixel of a subsequent image. In this aspect, a "delta" image is generated of the differences in pixel intensity. A visual contrast of the delta image is enhanced to accentuate a characteristic associated with it, and it is visually rendered, as well as each subsequent delta image generated by each subsequent comparison. In this aspect, the delta image is integrated for each subsequent comparison An aspect of the invention may be a computer-implemented system with means for determining a plurality of differences in intensity between each pixel of a plurality of pixels of an image and each corresponding pixel of a subsequent image. In this aspect, the pixel intensity is the intensity of a specific color channel. In this aspect, a "delta" image is generated of the differences in pixel intensity. A visual contrast of the delta image is enhanced to accentuate a characteristic associated with it, and it is visually rendered, as well as each subsequent delta image generated by each subsequent comparison.

An aspect of the invention may be a computer-implemented system with means for determining a plurality of differences in intensity between each pixel of a plurality of pixels of an image and each corresponding pixel of a subsequent image. In this aspect, the pixel intensity is the intensity of the infrared color channel. In this aspect, a "delta" image is generated of the differences in pixel intensity. A visual contrast of the delta image is enhanced to accentuate a characteristic associated with it, and it is visually rendered, as well as each subsequent delta image generated by each subsequent comparison.

An aspect of the invention may be a computer-implemented system with means for determining a plurality of differences in intensity between each pixel of a plurality of pixels of an image and each corresponding pixel of a subsequent image. In this aspect, the pixel intensity is the intensity of a specific color channel. In this aspect, a "delta" image is generated of the differences in pixel intensity. A visual contrast of the delta image is enhanced to accentuate a characteristic associated with it, and it is visually rendered, as well as each subsequent delta image generated by each subsequent comparison. In this aspect, the delta image is integrated for each subsequent comparison An aspect of the invention may be a computer-implemented system with means for determining a plurality of differences in intensity between each pixel of a plurality of pixels of an image and each corresponding pixel of a subsequent image. In this aspect, the pixel intensity is the intensity of the infrared color channel. In this aspect, a "delta" image is generated of the differences in pixel intensity. A visual contrast of the delta image is enhanced to accentuate a characteristic associated with it, and it is visually rendered, as well as each subsequent delta image generated by each subsequent comparison. In this aspect, the delta image is integrated for each subsequent comparison An aspect of the invention may be a computer-implemented system with means for determining a plurality of differences in intensity between each pixel of a plurality of pixels of an image of a human face and each corresponding pixel of a subsequent image of the human face. In this aspect, a "delta" image is generated of the differences in pixel intensity. A visual contrast of the delta image is enhanced to accentuate a characteristic associated with it, and it is visually rendered, as well as each subsequent delta image generated by each subsequent comparison.

An aspect of the invention may be a computer-implemented system with means for determining a plurality of differences in intensity between each pixel of a plurality of pixels of an image of a human face and each corresponding pixel of a subsequent image of the human face. In this aspect, a "delta" image is generated of the differences in pixel intensity. A visual contrast of the delta image is enhanced to accentuate a characteristic associated with it, and it is visually rendered, as well as each subsequent delta image generated by each subsequent comparison.

An aspect of the invention may be a computer-implemented system with means for determining a plurality of differences in intensity between each pixel of a plurality of pixels of an image of a human face and each corresponding pixel of a subsequent image of the human face. In this aspect, the pixel intensity is the intensity of a specific color channel. In this aspect, a "delta" image is generated of the differences in pixel intensity. A visual contrast of the delta image is enhanced to accentuate a characteristic associated with it, and it is visually rendered, as well as each subsequent delta image generated by each subsequent comparison.

An aspect of the invention may be a computer-implemented system with means for determining a plurality of differences in intensity between each pixel of a plurality of pixels of an image of a human face and each corresponding pixel of a subsequent image of the human face. In this aspect, the pixel intensity is the intensity of the infrared color channel. In this aspect, a "delta" image is generated of the differences in pixel intensity. A visual contrast of the delta image is enhanced to accentuate a characteristic associated with it, and it is visually rendered, as well as each subsequent delta image generated by each subsequent comparison.

An aspect of the invention may be a computer-implemented system with means for determining a plurality of differences in intensity between each pixel of a plurality of pixels of an image of a human face and each corresponding pixel of a subsequent image of a human face. The images in this aspect are captured by a capture device. In this aspect, a "delta" image is generated of the differences in pixel intensity. A visual contrast of the delta image is enhanced to accentuate a characteristic associated with it, and it is visually rendered, as well as each subsequent delta image generated by each subsequent comparison.

An aspect of the invention may be a computer-implemented system with means for determining a plurality of differences in intensity between each pixel of a plurality of pixels of an image of a human face and each corresponding pixel of a subsequent image of the human face. In this aspect, the pixel intensity is the intensity of a specific color channel. In this aspect, a "delta" image is generated of the differences in pixel intensity. A visual contrast of the delta image is enhanced to accentuate a characteristic associated with it, and it is visually rendered, as well as each subsequent delta image generated by each subsequent comparison. In this aspect, the delta image is integrated for each subsequent comparison An aspect of the invention may be a computer-implemented system with means for determining a plurality of differences in intensity between each pixel of a plurality of pixels of an image of a human face and each corresponding pixel of a subsequent image of the human face. In this aspect, the pixel intensity is the intensity of the infrared color channel. In this aspect, a "delta" image is generated of the differences in pixel intensity. A visual contrast of the delta image is enhanced to accentuate a characteristic associated with it, and it is visually rendered, as well as each subsequent delta image generated by each subsequent comparison. In this aspect, the delta image is integrated for each subsequent comparison An aspect of the invention may be a computer-implemented system with means for determining a plurality of differences in intensity between each pixel of a plurality of pixels of an image of a human face and each corresponding pixel of a subsequent image of the human face. In this aspect, a "delta" image is generated of the differences in pixel intensity. A visual contrast of the delta image is enhanced to accentuate a characteristic associated with it, and it is visually rendered, as well as each subsequent delta image generated by each subsequent comparison. In this aspect, the delta image is integrated for each subsequent comparison An aspect of the invention may be a computer-implemented system with means for determining a plurality of differences in intensity between each pixel of a plurality of pixels of an image of a human face and each corresponding pixel of a subsequent image of the human face. In this aspect, the pixel intensity is the intensity of a specific color channel. In this aspect, a "delta" image is generated of the differences in pixel intensity. A visual contrast of the delta image is enhanced to accentuate a characteristic associated with it, and it is visually rendered, as well as each subsequent delta image generated by each subsequent comparison.

An aspect of the invention may be a computer-implemented system with means for determining a plurality of differences in intensity between each pixel of a plurality of pixels of an image of a human face and each corresponding pixel of a subsequent image of the human face. In this aspect, the pixel intensity is the intensity of the infrared color channel. In this aspect, a "delta" image is generated of the differences in pixel intensity. A visual contrast of the delta image is enhanced to accentuate a characteristic associated with it, and it is visually rendered, as well as each subsequent delta image generated by each subsequent comparison.

An aspect of the invention may be a computer-implemented system with means for determining a plurality of differences in intensity between each pixel of a plurality of pixels of an image of a human face and each corresponding pixel of a subsequent image of the human face. In this aspect, the pixel intensity is the intensity of a specific color channel. In this aspect, a "delta" image is generated of the differences in pixel intensity. A visual contrast of the delta image is enhanced to accentuate a characteristic associated with it, and it is visually rendered, as well as each subsequent delta image generated by each subsequent comparison. In this aspect, the delta image is integrated for each subsequent comparison An aspect of the invention may be a computer-implemented system with means for determining a plurality of differences in intensity between each pixel of a plurality of pixels of an image of a human face and each corresponding pixel of a subsequent image of the human face. In this aspect, the pixel intensity is the intensity of the infrared color channel. In this aspect, a "delta" image is generated of the differences in pixel intensity. A visual contrast of the delta image is enhanced to accentuate a characteristic associated with it, and it is visually rendered, as well as each subsequent delta image generated by each subsequent comparison.

An aspect of the invention may be a computer-implemented system with means for determining a plurality of differences in intensity between each pixel of a plurality of pixels of an image of a human face and each corresponding pixel of a subsequent image of the human face. In this aspect, a "delta" image is generated of the differences in pixel intensity, representing a blood flow in the human face. A visual contrast of the delta image is enhanced to accentuate a characteristic associated with it, and it is visually rendered, as well as each subsequent delta image generated by each subsequent comparison.

An aspect of the invention may be a computer-implemented system with means for determining a plurality of differences in intensity between each pixel of a plurality of pixels of an image of a human face and each corresponding pixel of a subsequent image of the human face. In this aspect, a "delta" image is generated of the differences in pixel intensity, representing a blood flow in the human face. A visual contrast of the delta image is enhanced to accentuate a characteristic associated with it, and it is visually rendered, as well as each subsequent delta image generated by each subsequent comparison.

An aspect of the invention may be a computer-implemented system with means for determining a plurality of differences in intensity between each pixel of a plurality of pixels of an image of a human face and each corresponding pixel of a subsequent image of the human face. In this aspect, the pixel intensity is the intensity of a specific color channel. In this aspect, a "delta" image is generated of the differences in pixel intensity, representing a blood flow in the human face. A visual contrast of the delta image is enhanced to accentuate a characteristic associated with it, and it is visually rendered, as well as each subsequent delta image generated by each subsequent comparison.

An aspect of the invention may be a computer-implemented system with means for determining a plurality of differences in intensity between each pixel of a plurality of pixels of an image of a human face and each corresponding pixel of a subsequent image of the human face. In this aspect, the pixel intensity is the intensity of the infrared color channel. In this aspect, a "delta" image is generated of the differences in pixel intensity, representing a blood flow in the human face. A visual contrast of the delta image is enhanced to accentuate a characteristic associated with it, and it is visually rendered, as well as each subsequent delta image generated by each subsequent comparison.

An aspect of the invention may be a computer-implemented system with means for determining a plurality of differences in intensity between each pixel of a plurality of pixels of an image of a human face and each corresponding pixel of a subsequent image of a human face. The images in this aspect are captured by a capture device. In this aspect, a "delta" image is generated of the differences in pixel intensity, representing a blood flow in the human face. A visual contrast of the delta image is enhanced to accentuate a characteristic associated with it, and it is visually rendered, as well as each subsequent delta image generated by each subsequent comparison.

An aspect of the invention may be a computer-implemented system with means for determining a plurality of differences in intensity between each pixel of a plurality of pixels of an image of a human face and each corresponding pixel of a subsequent image of the human face. In this aspect, the pixel intensity is the intensity of a specific color channel. In this aspect, a "delta" image is generated of the differences in pixel intensity, representing a blood flow in the human face. A visual contrast of the delta image is enhanced to accentuate a characteristic associated with it, and it is visually rendered, as well as each subsequent delta image generated by each subsequent comparison. In this aspect, the delta image is integrated for each subsequent comparison An aspect of the invention may be a computer-implemented system with means for determining a plurality of differences in intensity between each pixel of a plurality of pixels of an image of a human face and each corresponding pixel of a subsequent image of the human face. In this aspect, the pixel intensity is the intensity of the infrared color channel. In this aspect, a "delta" image is generated of the differences in pixel intensity, representing a blood flow in the human face. A visual contrast of the delta image is enhanced to accentuate a characteristic associated with it, and it is visually rendered, as well as each subsequent delta image generated by each subsequent comparison. In this aspect, the delta image is integrated for each subsequent comparison An aspect of the invention may be a computer-implemented system with means for determining a plurality of differences in intensity between each pixel of a plurality of pixels of an image of a human face and each corresponding pixel of a subsequent image of the human face. In this aspect, a "delta" image is generated of the differences in pixel intensity, representing a blood flow in the human face. A visual contrast of the delta image is enhanced to accentuate a characteristic associated with it, and it is visually rendered, as well as each subsequent delta image generated by each subsequent comparison. In this aspect, the delta image is integrated for each subsequent comparison An aspect of the invention may be a computer-implemented system with means for determining a plurality of differences in intensity between each pixel of a plurality of pixels of an image of a human face and each corresponding pixel of a subsequent image of the human face. In this aspect, the pixel intensity is the intensity of a specific color channel. In this aspect, a "delta" image is generated of the differences in pixel intensity, representing a blood flow in the human face. A visual contrast of the delta image is enhanced to accentuate a characteristic associated with it, and it is visually rendered, as well as each subsequent delta image generated by each subsequent comparison.

An aspect of the invention may be a computer-implemented system with means for determining a plurality of differences in intensity between each pixel of a plurality of pixels of an image of a human face and each corresponding pixel of a subsequent image of the human face. In this aspect, the pixel intensity is the intensity of the infrared color channel. In this aspect, a "delta" image is generated of the differences in pixel intensity, representing a blood flow in the human face. A visual contrast of the delta image is enhanced to accentuate a characteristic associated with it, and it is visually rendered, as well as each subsequent delta image generated by each subsequent comparison.

An aspect of the invention may be a computer-implemented system with means for determining a plurality of differences in intensity between each pixel of a plurality of pixels of an image of a human face and each corresponding pixel of a subsequent image of the human face. In this aspect, the pixel intensity is the intensity of a specific color channel. In this aspect, a "delta" image is generated of the differences in pixel intensity, representing a blood flow in the human face. A visual contrast of the delta image is enhanced to accentuate a characteristic associated with it, and it is visually rendered, as well as each subsequent delta image generated by each subsequent comparison. In this aspect, the delta image is integrated for each subsequent comparison An aspect of the invention may be a computer-implemented system with means for determining a plurality of differences in intensity between each pixel of a plurality of pixels of an image of a human face and each corresponding pixel of a subsequent image of the human face. In this aspect, the pixel intensity is the intensity of the infrared color channel. In this aspect, a "delta" image is generated of the differences in pixel intensity, representing a blood flow in the human face. A visual contrast of the delta image is enhanced to accentuate a characteristic associated with it, and it is visually rendered, as well as each subsequent delta image generated by each subsequent comparison.

An aspect of the invention may be a computer readable storage medium with means for determining a plurality of differences in intensity between each pixel of a plurality of pixels of an image and each corresponding pixel of a subsequent image. In this aspect, a "delta" image is generated of the differences in pixel intensity. A visual contrast of the delta image is enhanced to accentuate a characteristic associated with it, and it is visually rendered, as well as each subsequent delta image generated by each subsequent comparison.

An aspect of the invention may be a computer readable storage medium with means for determining a plurality of differences in intensity between each pixel of a plurality of pixels of an image and each corresponding pixel of a subsequent image. In this aspect, a "delta" image is generated of the differences in pixel intensity. A visual contrast of the delta image is enhanced to accentuate a characteristic associated with it, and it is visually rendered, as well as each subsequent delta image generated by each subsequent comparison. In this aspect, the delta image is integrated for each subsequent comparison An aspect of the invention may be a computer readable storage medium with means for determining a plurality of differences in intensity between each pixel of a plurality of pixels of an image and each corresponding pixel of a subsequent image. In this aspect, the pixel intensity is the intensity of a specific color channel. In this aspect, a "delta" image is generated of the differences in pixel intensity. A visual contrast of the delta image is enhanced to accentuate a characteristic associated with it, and it is visually rendered, as well as each subsequent delta image generated by each subsequent comparison.

An aspect of the invention may be a computer readable storage medium with means for determining a plurality of differences in intensity between each pixel of a plurality of pixels of an image and each corresponding pixel of a subsequent image. In this aspect, the pixel intensity is the intensity of a specific color channel. In this aspect, a "delta" image is generated of the differences in pixel intensity. A visual contrast of the delta image is enhanced to accentuate a characteristic associated with it, and it is visually rendered, as well as each subsequent delta image generated by each subsequent comparison. In this aspect, the delta image is integrated for each subsequent comparison An aspect of the invention may be a computer readable storage medium with means for determining a plurality of differences in intensity between each pixel of a plurality of pixels of an image and each corresponding pixel of a subsequent image. In this aspect, the pixel intensity is the intensity of the infrared color channel. In this aspect, a "delta" image is generated of the differences in pixel intensity. A visual contrast of the delta image is enhanced to accentuate a characteristic associated with it, and it is visually rendered, as well as each subsequent delta image generated by each subsequent comparison.

An aspect of the invention may be a computer readable storage medium with means for determining a plurality of differences in intensity between each pixel of a plurality of pixels of an image and each corresponding pixel of a subsequent image. In this aspect, the pixel intensity is the intensity of the infrared color channel. In this aspect, a "delta" image is generated of the differences in pixel intensity. A visual contrast of the delta image is enhanced to accentuate a characteristic associated with it, and it is visually rendered, as well as each subsequent delta image generated by each subsequent comparison. In this aspect, the delta image is integrated for each subsequent comparison An aspect of the invention may be a computer readable storage medium with means for determining a plurality of differences in intensity between each pixel of a plurality of pixels of an image and each corresponding pixel of a subsequent image. The images in this aspect are captured by a capture device. In this aspect, a "delta" image is generated of the differences in pixel intensity. A visual contrast of the delta image is enhanced to accentuate a characteristic associated with it, and it is visually rendered, as well as each subsequent delta image generated by each subsequent comparison.

An aspect of the invention may be a computer readable storage medium with means for determining a plurality of differences in intensity between each pixel of a plurality of pixels of an image and each corresponding pixel of a subsequent image. In this aspect, a "delta" image is generated of the differences in pixel intensity. A visual contrast of the delta image is enhanced to accentuate a characteristic associated with it, and it is visually rendered, as well as each subsequent delta image generated by each subsequent comparison. In this aspect, the delta image is integrated for each subsequent comparison An aspect of the invention may be a computer readable storage medium with means for determining a plurality of differences in intensity between each pixel of a plurality of pixels of an image and each corresponding pixel of a subsequent image. In this aspect, the pixel intensity is the intensity of a specific color channel. In this aspect, a "delta" image is generated of the differences in pixel intensity. A visual contrast of the delta image is enhanced to accentuate a characteristic associated with it, and it is visually rendered, as well as each subsequent delta image generated by each subsequent comparison.

An aspect of the invention may be a computer readable storage medium with means for determining a plurality of differences in intensity between each pixel of a plurality of pixels of an image and each corresponding pixel of a subsequent image. In this aspect, the pixel intensity is the intensity of the infrared color channel. In this aspect, a "delta" image is generated of the differences in pixel intensity. A visual contrast of the delta image is enhanced to accentuate a characteristic associated with it, and it is visually rendered, as well as each subsequent delta image generated by each subsequent comparison.

An aspect of the invention may be a computer readable storage medium with means for determining a plurality of differences in intensity between each pixel of a plurality of pixels of an image and each corresponding pixel of a subsequent image. In this aspect, the pixel intensity is the intensity of a specific color channel. In this aspect, a "delta" image is generated of the differences in pixel intensity. A visual contrast of the delta image is enhanced to accentuate a characteristic associated with it, and it is visually rendered, as well as each subsequent delta image generated by each subsequent comparison. In this aspect, the delta image is integrated for each subsequent comparison An aspect of the invention may be a computer readable storage medium with means for determining a plurality of differences in intensity between each pixel of a plurality of pixels of an image and each corresponding pixel of a subsequent image. In this aspect, the pixel intensity is the intensity of the infrared color channel. In this aspect, a "delta" image is generated of the differences in pixel intensity. A visual contrast of the delta image is enhanced to accentuate a characteristic associated with it, and it is visually rendered, as well as each subsequent delta image generated by each subsequent comparison. In this aspect, the delta image is integrated for each subsequent comparison An aspect of the invention may be a computer readable storage medium with means for determining a plurality of differences in intensity between each pixel of a plurality of pixels of an image of a human face and each corresponding pixel of a subsequent image of the human face. In this aspect, a "delta" image is generated of the differences in pixel intensity. A visual contrast of the delta image is enhanced to accentuate a characteristic associated with it, and it is visually rendered, as well as each subsequent delta image generated by each subsequent comparison.

An aspect of the invention may be a computer readable storage medium with means for determining a plurality of differences in intensity between each pixel of a plurality of pixels of an image of a human face and each corresponding pixel of a subsequent image of the human face. In this aspect, a "delta" image is generated of the differences in pixel intensity. A visual contrast of the delta image is enhanced to accentuate a characteristic associated with it, and it is visually rendered, as well as each subsequent delta image generated by each subsequent comparison.

An aspect of the invention may be a computer readable storage medium with means for determining a plurality of differences in intensity between each pixel of a plurality of pixels of an image of a human face and each corresponding pixel of a subsequent image of the human face. In this aspect, the pixel intensity is the intensity of a specific color channel. In this aspect, a "delta" image is generated of the differences in pixel intensity. A visual contrast of the delta image is enhanced to accentuate a characteristic associated with it, and it is visually rendered, as well as each subsequent delta image generated by each subsequent comparison.

An aspect of the invention may be a computer readable storage medium with means for determining a plurality of differences in intensity between each pixel of a plurality of pixels of an image of a human face and each corresponding pixel of a subsequent image of the human face. In this aspect, the pixel intensity is the intensity of the infrared color channel. In this aspect, a "delta" image is generated of the differences in pixel intensity. A visual contrast of the delta image is enhanced to accentuate a characteristic associated with it, and it is visually rendered, as well as each subsequent delta image generated by each subsequent comparison.

An aspect of the invention may be a computer readable storage medium with means for determining a plurality of differences in intensity between each pixel of a plurality of pixels of an image of a human face and each corresponding pixel of a subsequent image of a human face. The images in this aspect are captured by a capture device. In this aspect, a "delta" image is generated of the differences in pixel intensity. A visual contrast of the delta image is enhanced to accentuate a characteristic associated with it, and it is visually rendered, as well as each subsequent delta image generated by each subsequent comparison.

An aspect of the invention may be a computer readable storage medium with means for determining a plurality of differences in intensity between each pixel of a plurality of pixels of an image of a human face and each corresponding pixel of a subsequent image of the human face. In this aspect, the pixel intensity is the intensity of a specific color channel. In this aspect, a "delta" image is generated of the differences in pixel intensity. A visual contrast of the delta image is enhanced to accentuate a characteristic associated with it, and it is visually rendered, as well as each subsequent delta image generated by each subsequent comparison. In this aspect, the delta image is integrated for each subsequent comparison An aspect of the invention may be a computer readable storage medium with means for determining a plurality of differences in intensity between each pixel of a plurality of pixels of an image of a human face and each corresponding pixel of a subsequent image of the human face. In this aspect, the pixel intensity is the intensity of the infrared color channel. In this aspect, a "delta" image is generated of the differences in pixel intensity. A visual contrast of the delta image is enhanced to accentuate a characteristic associated with it, and it is visually rendered, as well as each subsequent delta image generated by each subsequent comparison. In this aspect, the delta image is integrated for each subsequent comparison An aspect of the invention may be a computer readable storage medium with means for determining a plurality of differences in intensity between each pixel of a plurality of pixels of an image of a human face and each corresponding pixel of a subsequent image of the human face. In this aspect, the pixel intensity is the intensity of a specific color channel. In this aspect, a "delta" image is generated of the differences in pixel intensity. A visual contrast of the delta image is enhanced to accentuate a characteristic associated with it, and it is visually rendered, as well as each subsequent delta image generated by each subsequent comparison.

An aspect of the invention may be a computer readable storage medium with means for determining a plurality of differences in intensity between each pixel of a plurality of pixels of an image of a human face and each corresponding pixel of a subsequent image of the human face. In this aspect, the pixel intensity is the intensity of the infrared color channel. In this aspect, a "delta" image is generated of the differences in pixel intensity. A visual contrast of the delta image is enhanced to accentuate a characteristic associated with it, and it is visually rendered, as well as each subsequent delta image generated by each subsequent comparison.

An aspect of the invention may be a computer readable storage medium with means for determining a plurality of differences in intensity between each pixel of a plurality of pixels of an image of a human face and each corresponding pixel of a subsequent image of the human face. In this aspect, the pixel intensity is the intensity of a specific color channel. In this aspect, a "delta" image is generated of the differences in pixel intensity. A visual contrast of the delta image is enhanced to accentuate a characteristic associated with it, and it is visually rendered, as well as each subsequent delta image generated by each subsequent comparison. In this aspect, the delta image is integrated for each subsequent comparison An aspect of the invention may be a computer readable storage medium with means for determining a plurality of differences in intensity between each pixel of a plurality of pixels of an image of a human face and each corresponding pixel of a subsequent image of the human face. In this aspect, the pixel intensity is the intensity of the infrared color channel. In this aspect, a "delta" image is generated of the differences in pixel intensity. A visual contrast of the delta image is enhanced to accentuate a characteristic associated with it, and it is visually rendered, as well as each subsequent delta image generated by each subsequent comparison.

An aspect of the invention may be a computer readable storage medium with means for determining a plurality of differences in intensity between each pixel of a plurality of pixels of an image of a human face and each corresponding pixel of a subsequent image of the human face. In this aspect, the pixel intensity is the intensity of a specific color channel. In this aspect, a "delta" image is generated of the differences in pixel intensity. A visual contrast of the delta image is enhanced to accentuate a characteristic associated with it, and it is visually rendered, as well as each subsequent delta image generated by each subsequent comparison. In this aspect, the delta image is integrated for each subsequent comparison An aspect of the invention may be a computer readable storage medium with means for determining a plurality of differences in intensity between each pixel of a plurality of pixels of an image of a human face and each corresponding pixel of a subsequent image of the human face. In this aspect, the pixel intensity is the intensity of the infrared color channel. In this aspect, a "delta" image is generated of the differences in pixel intensity. A visual contrast of the delta image is enhanced to accentuate a characteristic associated with it, and it is visually rendered, as well as each subsequent delta image generated by each subsequent comparison.

An aspect of the invention may be a computer readable storage medium with means for determining a plurality of differences in intensity between each pixel of a plurality of pixels of an image of a human face and each corresponding pixel of a subsequent image of the human face. In this aspect, a "delta" image is generated of the differences in pixel intensity, representing a blood flow in the human face. A visual contrast of the delta image is enhanced to accentuate a characteristic associated with it, and it is visually rendered, as well as each subsequent delta image generated by each subsequent comparison.

An aspect of the invention may be a computer readable storage medium with means for determining a plurality of differences in intensity between each pixel of a plurality of pixels of an image of a human face and each corresponding pixel of a subsequent image of the human face. In this aspect, a "delta" image is generated of the differences in pixel intensity, representing a blood flow in the human face. A visual contrast of the delta image is enhanced to accentuate a characteristic associated with it, and it is visually rendered, as well as each subsequent delta image generated by each subsequent comparison.

An aspect of the invention may be a computer readable storage medium with means for determining a plurality of differences in intensity between each pixel of a plurality of pixels of an image of a human face and each corresponding pixel of a subsequent image of the human face. In this aspect, the pixel intensity is the intensity of a specific color channel. In this aspect, a "delta" image is generated of the differences in pixel intensity, representing a blood flow in the human face. A visual contrast of the delta image is enhanced to accentuate a characteristic associated with it, and it is visually rendered, as well as each subsequent delta image generated by each subsequent comparison.

An aspect of the invention may be a computer readable storage medium with means for determining a plurality of differences in intensity between each pixel of a plurality of pixels of an image of a human face and each corresponding pixel of a subsequent image of the human face. In this aspect, the pixel intensity is the intensity of the infrared color channel. In this aspect, a "delta" image is generated of the differences in pixel intensity, representing a blood flow in the human face. A visual contrast of the delta image is enhanced to accentuate a characteristic associated with it, and it is visually rendered, as well as each subsequent delta image generated by each subsequent comparison.

An aspect of the invention may be a computer readable storage medium with means for determining a plurality of differences in intensity between each pixel of a plurality of pixels of an image of a human face and each corresponding pixel of a subsequent image of a human face. The images in this aspect are captured by a capture device. In this aspect, a "delta" image is generated of the differences in pixel intensity, representing a blood flow in the human face. A visual contrast of the delta image is enhanced to accentuate a characteristic associated with it, and it is visually rendered, as well as each subsequent delta image generated by each subsequent comparison.

An aspect of the invention may be a computer readable storage medium with means for determining a plurality of differences in intensity between each pixel of a plurality of pixels of an image of a human face and each corresponding pixel of a subsequent image of the human face. In this aspect, the pixel intensity is the intensity of a specific color channel. In this aspect, a "delta" image is generated of the differences in pixel intensity, representing a blood flow in the human face. A visual contrast of the delta image is enhanced to accentuate a characteristic associated with it, and it is visually rendered, as well as each subsequent delta image generated by each subsequent comparison. In this aspect, the delta image is integrated for each subsequent comparison An aspect of the invention may be a computer readable storage medium with means for determining a plurality of differences in intensity between each pixel of a plurality of pixels of an image of a human face and each corresponding pixel of a subsequent image of the human face. In this aspect, the pixel intensity is the intensity of the infrared color channel. In this aspect, a "delta" image is generated of the differences in pixel intensity, representing a blood flow in the human face. A visual contrast of the delta image is enhanced to accentuate a characteristic associated with it, and it is visually rendered, as well as each subsequent delta image generated by each subsequent comparison. In this aspect, the delta image is integrated for each subsequent comparison An aspect of the invention may be a computer readable storage medium with means for determining a plurality of differences in intensity between each pixel of a plurality of pixels of an image of a human face and each corresponding pixel of a subsequent image of the human face. In this aspect, a "delta" image is generated of the differences in pixel intensity, representing a blood flow in the human face. A visual contrast of the delta image is enhanced to accentuate a characteristic associated with it, and it is visually rendered, as well as each subsequent delta image generated by each subsequent comparison. In this aspect, the delta image is integrated for each subsequent comparison An aspect of the invention may be a computer readable storage medium with means for determining a plurality of differences in intensity between each pixel of a plurality of pixels of an image of a human face and each corresponding pixel of a subsequent image of the human face. In this aspect, the pixel intensity is the intensity of a specific color channel. In this aspect, a "delta" image is generated of the differences in pixel intensity, representing a blood flow in the human face. A visual contrast of the delta image is enhanced to accentuate a characteristic associated with it, and it is visually rendered, as well as each subsequent delta image generated by each subsequent comparison.

An aspect of the invention may be a computer readable storage medium with means for determining a plurality of differences in intensity between each pixel of a plurality of pixels of an image of a human face and each corresponding pixel of a subsequent image of the human face. In this aspect, the pixel intensity is the intensity of the infrared color channel. In this aspect, a "delta" image is generated of the differences in pixel intensity, representing a blood flow in the human face. A visual contrast of the delta image is enhanced to accentuate a characteristic associated with it, and it is visually rendered, as well as each subsequent delta image generated by each subsequent comparison.

An aspect of the invention may be a computer readable storage medium with means for determining a plurality of differences in intensity between each pixel of a plurality of pixels of an image of a human face and each corresponding pixel of a subsequent image of the human face. In this aspect, the pixel intensity is the intensity of a specific color channel. In this aspect, a "delta" image is generated of the differences in pixel intensity, representing a blood flow in the human face. A visual contrast of the delta image is enhanced to accentuate a characteristic associated with it, and it is visually rendered, as well as each subsequent delta image generated by each subsequent comparison. In this aspect, the delta image is integrated for each subsequent comparison An aspect of the invention may be a computer readable storage medium with means for determining a plurality of differences in intensity between each pixel of a plurality of pixels of an image of a human face and each corresponding pixel of a subsequent image of the human face. In this aspect, the pixel intensity is the intensity of the infrared color channel. In this aspect, a "delta" image is generated of the differences in pixel intensity, representing a blood flow in the human face. A visual contrast of the delta image is enhanced to accentuate a characteristic associated with it, and it is visually rendered, as well as each subsequent delta image generated by each subsequent comparison.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It is intended that the scope of the technology be defined by the claims appended hereto.

What is claimed is:

1. A method comprising:
   capturing a first image comprising a plurality of pixel intensities;
   generating a region set of pixel intensities of the first image comprising a subset of the pixel intensities of the first image;
   generating a delta image comprising a plurality of differences in intensity comprising a difference in intensity between each pixel intensity of the region set of pixel intensities of the first image and each pixel intensity of a corresponding region set of pixel intensities of a subsequent second image comprising a plurality of pixel intensities corresponding to the plurality of pixel intensities of the first image; and
   visually rendering, for a subsequent comparison, an integrated delta image comprising a second plurality of differences, the second plurality of differences comprising the differences between the plurality of differences of the delta image and the subsequent plurality of differences of the delta image and the subsequent plurality of differences of the subsequent delta image.

2. The method of claim 1, further comprising applying bias correction to the integrated delta image.

3. The method of claim 1, wherein the plurality of pixel intensities comprises a plurality of intensities of a specific color channel.

4. The method of claim 3, wherein the color channel is infrared.

5. The method of claim 1, wherein the first image and the second image are collected by a capture device.

6. The method of claim 1, wherein the first image and the second image comprise images of a human face.

7. The method of claim 6, wherein the integrated delta image comprises a blood flow in the human face.

8. A system comprising:
   a processor; and
   a memory coupled to the processor, the memory having stored thereon executable instructions that when executed by the processor cause the processor to effectuate operations comprising:
   capturing a first image comprising a plurality of pixel intensities;
   generating a region set of pixel intensities of the first image comprising a subset of the pixel intensities of the first image;
   generating a delta image comprising a plurality of differences in intensity comprising a difference in intensity between each pixel intensity of the region set of pixel intensities of the first image and each pixel intensity of a corresponding region set of pixel intensities of a subsequent second image comprising a plurality of pixel intensities corresponding to the plurality of pixel intensities of the first image; and
   visually rendering, for a subsequent comparison, an integrated delta image comprising a second plurality of differences, the second plurality of differences comprising the differences between the plurality of differences of the delta image and the subsequent plurality of differences of the delta image and the subsequent plurality of differences of the subsequent delta image.

9. The system of claim 8, wherein the plurality of pixel intensities comprises a plurality of intensities of a specific color channel.

10. The system of claim 9, wherein the color channel is infrared.

11. The system of claim 8, wherein the first image and second image are collected by a capture device in communication with the processor.

12. The system of claim 8, wherein the first image and the second image comprise images of a human face.

13. The system of claim 12, wherein the enhanced delta image comprises a blood flow in the human face.

14. A computer readable storage medium comprising executable instructions that when executed by a processor cause the processor to effectuate operations comprising:
   capturing a first image comprising a plurality of pixel intensities;
   generating a region set of pixel intensities of the first image comprising a subset of the pixel intensities of the first image;

generating a delta image comprising a plurality of differences in intensity comprising a difference in intensity between each pixel intensity of the region set of pixel intensities of the first image and each pixel intensity of a corresponding region set of pixel intensities of a subsequent second image comprising a plurality of pixel intensities corresponding to the plurality of pixel intensities of the first image;

visually rendering, for a subsequent comparison, an integrated delta image comprising a second plurality of differences, the second plurality of differences comprising the differences between the plurality of differences of the delta image and the subsequent plurality of differences of the delta image and the subsequent plurality of differences of the subsequent delta image.

15. The computer readable storage medium of claim 14, wherein the plurality of pixel intensities comprises a plurality of pixel intensities of a specific color channel.

16. The computer readable storage medium of claim 15, wherein the color channel is infrared.

17. The computer readable storage medium of claim 16, wherein the first image and the second image comprise images of a human face.

18. The computer readable storage medium of claim 17, wherein the enhanced delta image comprises a blood flow in the human face.

19. The system of claim 8, wherein the operations further comprise enhancing a visual contrast of the delta image to accentuate a characteristic associated with the delta image.

20. The computer-readable storage medium of claim 14, wherein the operations further comprise enhancing a visual contrast of the delta image to accentuate a characteristic associated with the delta image.

\* \* \* \* \*